(12) United States Patent
Peters

(10) Patent No.: US 10,162,330 B2
(45) Date of Patent: Dec. 25, 2018

(54) METHODS AND SYSTEMS FOR GENERATING A CONTINUOUS HELICAL TOOL PATH FOR PARTS HAVING MULTIPLE CENTRAL AXES

(71) Applicant: The Boeing Company, Chicago, IL (US)

(72) Inventor: Justin L. Peters, Alton, IL (US)

(73) Assignee: The Boeing Company, Chicago, IL (US)

(*) Notice: Subject to any disclaimer, the term of this patent is extended or adjusted under 35 U.S.C. 154(b) by 66 days.

(21) Appl. No.: 15/334,277

(22) Filed: Oct. 25, 2016

(65) Prior Publication Data
US 2018/0113432 A1    Apr. 26, 2018

(51) Int. Cl.
*G06F 19/00*    (2018.01)
*G05B 19/402*   (2006.01)

(52) U.S. Cl.
CPC .. *G05B 19/402* (2013.01); *G05B 2219/34146* (2013.01); *G05B 2219/36342* (2013.01); *G05B 2219/39573* (2013.01)

(58) Field of Classification Search
USPC ...................................................... 700/192
See application file for complete search history.

(56) References Cited

U.S. PATENT DOCUMENTS 8,033,151 B2  10/2011  Castle et al.
9,409,349 B2   8/2016  Huskamp et al.

2003/0204285 A1* 10/2003 Thomas ............. G05B 19/4097
                                                     700/182
2011/0184695 A1*  7/2011 Grzesiak ................ G01B 5/008
                                                     702/167
2013/0103177 A1*  4/2013 Cao ..................... B21D 31/005
                                                      700/98

(Continued)

OTHER PUBLICATIONS

Jeswiet, et al. "Asymmetric Single Point Incremental Forming of Sheet Metal", Elsevier, CIRP Annals vol. 54, Issue 2, 2005, pp. 88-114.*

(Continued)

*Primary Examiner* — Mohammad Ali
*Assistant Examiner* — Md Azad

(57) ABSTRACT

A computer-implemented method for generating a continuous helical tool path for forming a part having a plurality of central axes is provided. The method includes performing a tool path algorithm modeling and a tool path algorithm execution using a computer system. The tool path algorithm modeling includes defining a starting point location within a computer-generated three-dimensional part geometry model, defining a vector, defining a helix, defining a sweeping surface three-dimensional geometry element, and generating an intersection curve from tracing a continuous curved line of an intersection between the sweeping surface geometry element and the part geometry model. The tool path algorithm execution includes defining data for a forming tool stylus, selecting the intersection curve as a guiding element for the forming tool stylus, and generating the continuous helical tool path for the forming tool stylus. The continuous helical tool path includes a forming tool stylus centerline path in graphical space.

20 Claims, 19 Drawing Sheets

(56) References Cited

U.S. PATENT DOCUMENTS

2015/0034235 A1\* 2/2015 Huskamp ............... B21D 22/18
156/196
2015/0277436 A1\* 10/2015 Kalmar-Nagy ............................
G05B 19/40937
700/187

OTHER PUBLICATIONS

Skjoedt, et al. "Creating Helical Tool Paths for Single Point Incremental Forming", Key Engineering Materials, Proceedings of SheMet07 (ISSN: 1013-9826), 2007.\*

\* cited by examiner

METHODS AND SYSTEMS FOR GENERATING A CONTINUOUS HELICAL TOOL PATH FOR PARTS HAVING MULTIPLE CENTRAL AXES

STATEMENT REGARDING FEDERALLY SPONSORED RESEARCH/DEVELOPMENT

This invention was made with Government support under DE-EE0005764 awarded by The Department of Energy. The government has certain rights in this invention.

BACKGROUND

1) Field of the Disclosure

The disclosure relates generally to methods and systems for manufacturing parts having complex geometries, and more particularly, to methods and systems for manufacturing, such as incremental sheet forming (ISF) manufacturing, of parts having complex geometries with multiple central axes, using tool path algorithms generating a continuous helical tool path.

2) Description of Related Art

Sometimes it is desirable to bring air vehicles that are out of service or no longer in commercial production, back into service. Such air vehicles, e.g., heritage aircraft and rotorcraft, may require replacement parts or spare parts often made of sheet metal. Production of such replacement parts or spare parts may require use of the original tooling that was used to form the air vehicle parts. Such original tooling may need to be located, recalled from storage, cleaned, evaluated, and often repaired before it can be used again for part production. In some cases, the original tooling cannot be located or is not serviceable, and new tooling must be fabricated for a typically limited production run of a small quantity of parts. This, in turn, may result in a high, non-recurring expense incurred to return the air vehicle to service. In addition, the lead time to fabricate the new tooling and manufacture the part may often be a long period of time, for example, greater than 200 days from design to manufacture.

Part forming processes, such as incremental sheet forming (ISF) manufacturing, may be used to manufacture such replacement or spare parts for air vehicles coming back into service. In particular, ISF manufacturing may provide decreased tooling costs and reduced lead times, as compared to other known machining or forming processes. ISF is a sheet metal forming process that uses a forming tool to deform sheet metal along a predefined tool path and to form the sheet metal into a final part. ISF tooling may be used with a computer numerical control machine or another suitable machine or system to form the sheet metal into the desired part shape.

ISF manufacturing may use known CAM (computer aided manufacturing) workbench tool path algorithms developed for machining type operations. However, while such known CAM workbench tool path algorithms may be beneficial for ISF manufacturing of parts with one central axis, they may not provide an optimal solution for parts, such as many air vehicle parts, having complex geometries with multiple central axes within the same surface.

One known CAM workbench tool path algorithm includes a Z level tool path algorithm that intersects a part design with parallel horizontal planes that are perpendicular to a tool axis. However, such Z level tool path algorithm may have issues with transitions between passes or levels of the complex part geometry. For example, a transition connection of the tool path motion may not follow the curvature or mold line of the complex part geometry, which can result in a discontinuous tool path motion. In addition, each transition to the next level of the complex part geometry typically requires the machine tool to stop and change direction causing acceleration and deceleration in transitions, which can create surface imperfections while forming on the physical part. This may, in turn, require additional surface treatment processes to remove or reduce the surface imperfections. Such additional surface treatment processes may increase the overall time and expense of the part manufacturing.

Additional known CAM workbench tool path algorithms include helix tool path algorithms and spiral tool path algorithms. Helix tool path algorithms are suitable for parts having one central axis, and spiral tool path algorithms are suitable for flat surfaces. However, helix tool path algorithms and spiral tool path algorithms may not be able to compute a calculation, and do not provide an optimal solution for parts having complex geometries with multiple central axes within the same surface.

Moreover, developing a CAM workbench tool path algorithm for ISF may have drawbacks. For example, developing a software package specific to implementing a CAM workbench tool path algorithm for ISF may be very expensive to develop and may require a lead time of two or more years from development to implementation.

Accordingly, there is a need in the art for methods and systems providing a universal tool path algorithm that can be used with part forming manufacturing, such as incremental sheet forming (ISF) manufacturing, of parts having complex geometries with multiple central axes, and which methods and systems have improved capability and quality, easy implementation, and provide advantages over known methods and systems.

SUMMARY

Example implementations of this disclosure provide methods and systems using tool path algorithms that generate a continuous helical tool path, and that can be used with incremental sheet forming (ISF) manufacturing of parts having complex geometries with multiple central axes. As discussed in the below detailed description, embodiments of the methods and systems may provide significant advantages over existing methods and systems.

In one exemplary embodiment there is provided a computer-implemented method for generating a continuous helical tool path for forming a part having a plurality of central axes. The method comprises performing a tool path algorithm modeling using a computer system.

The tool path algorithm modeling comprises defining a starting point location within a computer-generated three-dimensional part geometry model comprising a contoured recess having a periphery that includes a plurality of curvature surfaces respectively associated with a plurality of part geometry model central axes. The tool path algorithm modeling further comprises defining a vector starting from the starting point location. The tool path algorithm modeling further comprises defining a helix using a plurality of predetermined helix variables. The helix is defined within the contoured recess and is revolved around the vector.

The tool path algorithm modeling further comprises defining a sweeping surface three-dimensional geometry element representing a radial projection of the helix. The sweeping surface three-dimensional geometry element extends radially outwardly from a helix axial centerline, through a plurality of predetermined helix revolutions, to an exterior area that is exterior to the periphery of the computer-generated three-dimensional part geometry model.

The tool path algorithm modeling further comprises generating an intersection curve. The intersection curve results from tracing a continuous curved line of an intersection between the sweeping surface three-dimensional geometry element and a part geometry model surface of the computer-generated three-dimensional part geometry model.

The method further comprises performing a tool path algorithm execution using the computer system. The tool path algorithm execution comprises defining data for a forming tool stylus used to form the part having the plurality of central axes. The tool path algorithm execution further comprises selecting the intersection curve as a guiding element for the forming tool stylus to follow.

The tool path algorithm execution further comprises generating the continuous helical tool path for the forming tool stylus to use to form the part having the plurality of central axes. The part is based on the computer-generated three-dimensional part geometry model, and the continuous helical tool path includes a forming tool stylus centerline path in graphical space.

In another embodiment, there is provided a computer-implemented method for generating a continuous helical tool path for forming a sheet metal part having a plurality of central axes. The method comprises generating a computer-generated three-dimensional part geometry model comprising a contoured recess having a periphery that includes a plurality of curvature surfaces respectively associated with a plurality of part geometry model central axes.

The method further comprises performing a tool path algorithm modeling using a computer system. The computer system comprises at least a computer, a processor device for executing one or more functions of the computer, and a computer readable software program implemented tool path algorithm configured for use with the computer and the processor device.

The tool path algorithm modeling comprises defining a starting point location within the computer-generated three-dimensional part geometry model. The tool path algorithm modeling further comprises defining a vector starting from the starting point location. The tool path algorithm modeling further comprises defining a helix using a plurality of predetermined helix variables. The helix is defined within the contoured recess and is revolved around the vector.

The tool path algorithm modeling further comprises defining a sweeping surface three-dimensional geometry element representing a radial projection of the helix. The sweeping surface three-dimensional geometry element extends radially outwardly from a helix axial centerline, through a plurality of predetermined helix revolutions, to an exterior area that is exterior to the periphery of the computer-generated three-dimensional part geometry model.

The tool path algorithm modeling further comprises generating an intersection curve. The intersection curve results from tracing a continuous curved line of an intersection between the sweeping surface three-dimensional geometry element and a part geometry model surface of the computer-generated three-dimensional part geometry model.

The method further comprises performing a tool path algorithm execution using the computer system comprising at least the computer, the processor device, and the computer readable software program implemented tool path algorithm. The tool path algorithm execution comprises defining a forming tool stylus using a plurality of forming tool stylus parameters.

The tool path algorithm execution further comprises selecting the intersection curve as a guiding element for the forming tool stylus to follow. The tool path algorithm execution further comprises selecting a contact surface of the computer-generated three-dimensional part geometry model for the forming tool stylus to contact. The tool path algorithm execution further comprises defining a tool axis for the forming tool stylus. The tool path algorithm execution further comprises defining a forming feed rate for the forming tool stylus.

The tool path algorithm execution further comprises generating the continuous helical tool path for the forming tool stylus to use to form the sheet metal part having the plurality of central axes. The sheet metal part is based on the computer-generated three-dimensional part geometry model, and the continuous helical tool path includes a forming tool stylus centerline path in graphical space.

The method further comprises using the continuous helical tool path to generate an incremental sheet forming (ISF) machine program for execution on an incremental sheet forming (ISF) machine. The ISF machine uses an incremental sheet forming (ISF) process and the forming tool stylus to form the sheet metal part having the plurality of central axes.

In another embodiment, there is provided a system for generating a continuous helical tool path for forming a part having a plurality of central axes. The system comprises a computer-generated three-dimensional part geometry model comprising a contoured recess having a periphery that includes a plurality of curvature surfaces respectively associated with a plurality of part geometry model central axes.

The system further comprises a computer system. The computer system comprises at least a computer, a processor device for executing one or more functions of the computer, and a computer readable software program implemented tool path algorithm configured to perform via the computer and the processor device, a tool path algorithm modeling and a tool path algorithm execution.

The tool path algorithm modeling comprises defining a starting point location within the computer-generated three-dimensional part geometry model. The tool path algorithm modeling further comprises defining a vector starting from the starting point location. The tool path algorithm modeling further comprises defining a helix using a plurality of predetermined helix variables. The helix is defined within the contoured recess and revolved around the vector.

The tool path algorithm modeling further comprises defining a sweeping surface three-dimensional geometry element representing a radial projection of the helix. The sweeping surface three-dimensional geometry element extends radially outwardly from a helix axial centerline, through a plurality of predetermined helix revolutions, to an exterior area that is exterior to the periphery of the computer-generated three-dimensional part geometry model. The tool path algorithm modeling further comprises generating an intersection curve resulting from tracing a continuous curved line of an intersection between the sweeping surface three-dimensional geometry element and a part geometry model surface of the computer-generated three-dimensional part geometry model.

The tool path algorithm execution comprises defining data for a forming tool stylus used to form the part having the plurality of central axes. The tool path algorithm execution further comprises selecting the intersection curve as a guiding element for the forming tool stylus to follow.

The tool path algorithm execution further comprises generating the continuous helical tool path for the forming tool stylus to use to form the part having the plurality of central axes. The part is based on the computer-generated three-dimensional part geometry model, and the continuous helical tool path includes a forming tool stylus centerline path in graphical space.

The tool path algorithm execution further comprises generating a numerical control forming machine program from the continuous helical tool path, for execution on a numerical control forming machine, that uses a numerical control forming process and the forming tool stylus, to form the part having the plurality of central axes.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein.

The figures shown in this disclosure represent various aspects of the embodiments presented, and only differences will be discussed in detail.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and fully convey the scope of the disclosure to those skilled in the art.

Figure 1:
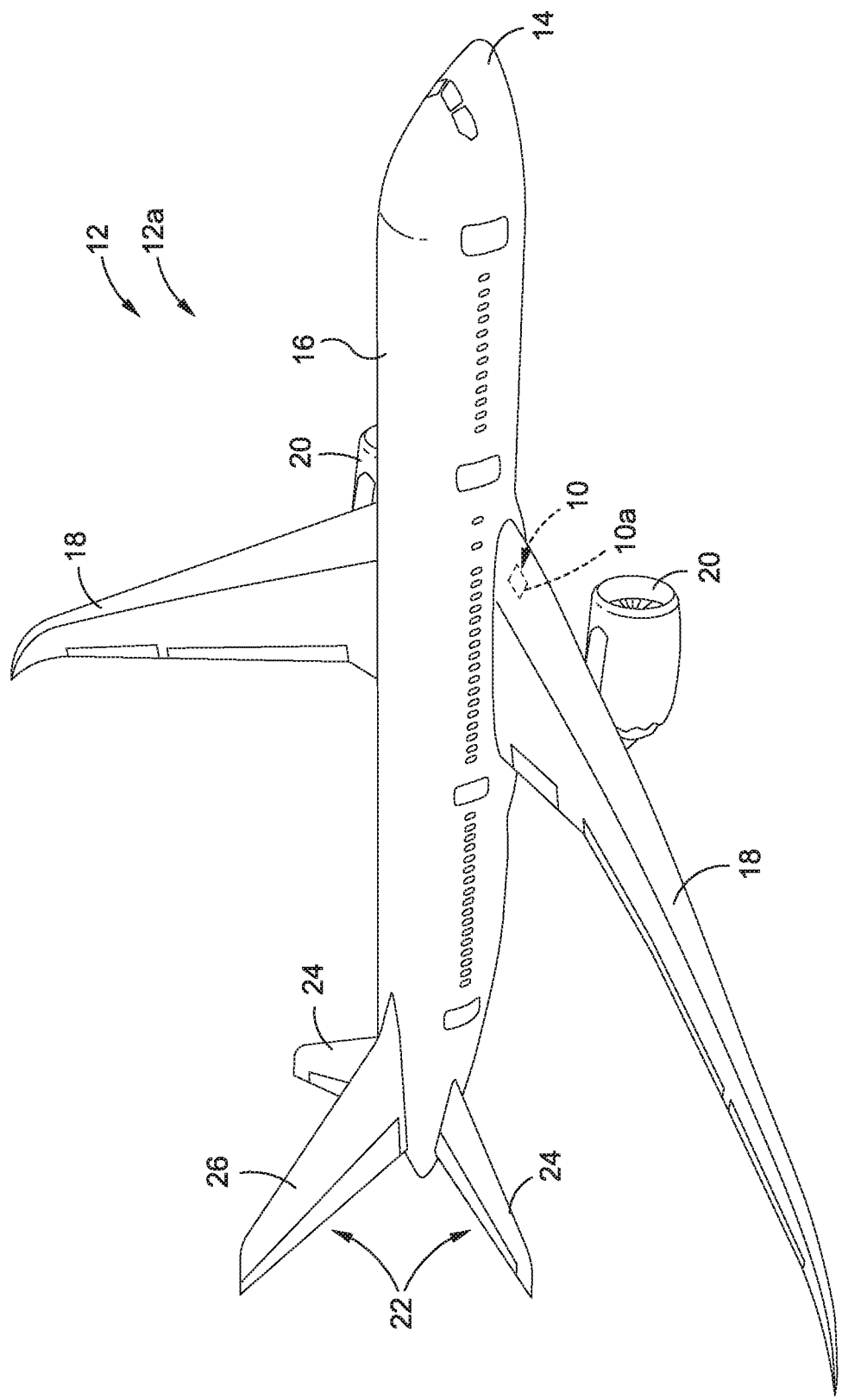
FIG. 1 is a diagrammatic representation of a perspective view of an air vehicle incorporating a part formed using one or more embodiments of the methods and systems of the disclosure.

Now referring to the Figures, FIG. 1 is a diagrammatic representation of a perspective view of an air vehicle 12, such as in the form of an aircraft 12a, that incorporates a part 10, such as a sheet metal part 10a, formed using one or more embodiments of a method 70 (see FIG. 4A), a method 90 (see FIG. 5A), and a system 120 (see FIG. 6) of the disclosure. As further shown in FIG. 1, the air vehicle 12, such as in the form of aircraft 12a, comprises a nose 14, fuselage 16, wings 18, engines 20, and an empennage 22 comprising horizontal stabilizers 24 and a vertical stabilizer 26. Although the aircraft 12a shown in FIG. 1 is generally representative of a commercial passenger aircraft having one or more parts 10, such as in the form of sheet metal parts 10a, the teachings of the disclosed embodiments may be applied to other passenger aircraft. For example, the teachings of the disclosed embodiments may be applied to cargo aircraft, military aircraft, rotorcraft, and other types of aircraft or aerial vehicles, as well as aerospace vehicles, satellites, space launch vehicles, rockets, and other aerospace vehicles.

Figure 2:
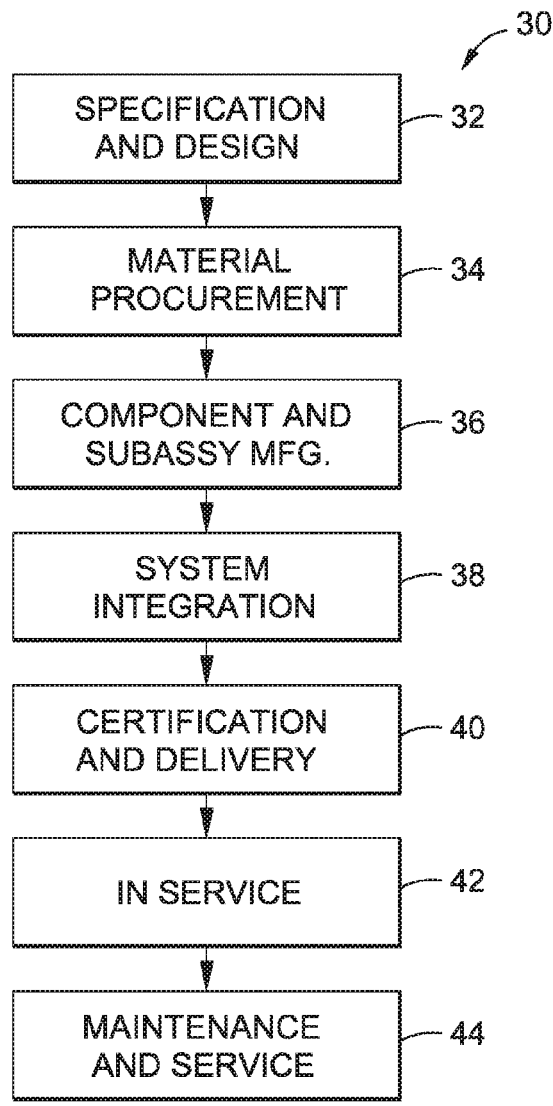
FIG. 2 is a flow diagram of an embodiment of an aircraft manufacturing and service method.
Figure 3:
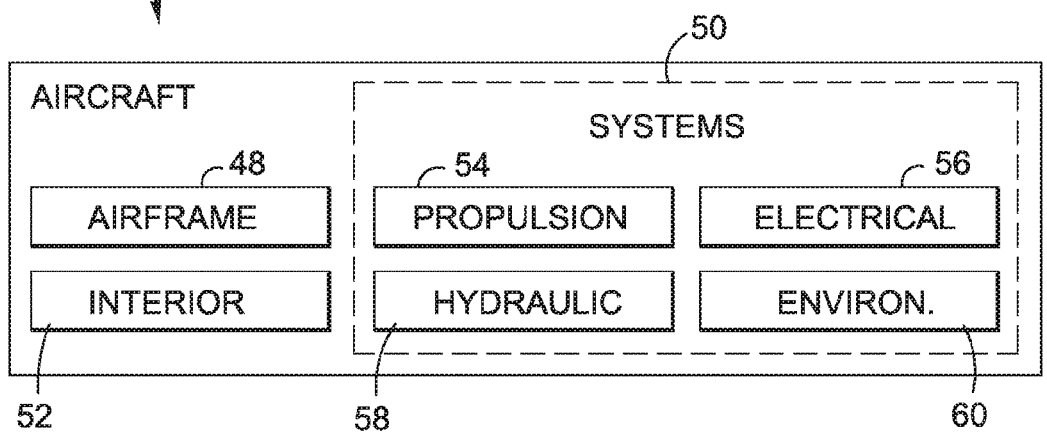
FIG. 3 is an illustration of a functional block diagram of an embodiment of an aircraft.

Now referring to FIGS. 2 and 3, FIG. 2 is a flow diagram of an embodiment of an aircraft manufacturing and service method 30, and FIG. 3 is an illustration of a functional block diagram of an embodiment of an aircraft 46. Referring to FIGS. 2-3, embodiments of the disclosure may be described in the context of the aircraft manufacturing and service method 30, as shown in FIG. 2, and the aircraft 46, as shown in FIG. 3. During pre-production, the exemplary aircraft manufacturing and service method 30 (see FIG. 2) may include specification and design 32 (see FIG. 2) of the aircraft 46 (see FIG. 3) and material procurement 34 (see FIG. 2). During manufacturing, component and subassembly manufacturing 36 (see FIG. 2) and system integration 38 (see FIG. 2) of the aircraft 46 (see FIG. 3) takes place. Thereafter, the aircraft 46 (see FIG. 3) may go through certification and delivery 40 (see FIG. 2) in order to be placed in service 42 (see FIG. 2). While in service 42 (see FIG. 2) by a customer, the aircraft 46 (see FIG. 3) may be scheduled for routine maintenance and service 44 (see FIG. 2), which may also include modification, reconfiguration, refurbishment, and other suitable services.

Each of the processes of the aircraft manufacturing and service method 30 (see FIG. 2) may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may include an airline, leasing company, military entity, service organization, and other suitable operators.

As shown in FIG. 3, the aircraft 46 produced by the exemplary aircraft manufacturing and service method 30 may include an airframe 48 with a plurality of systems 50 and an interior 52. As further shown in FIG. 3, examples of the systems 50 may include one or more of a propulsion system 54, an electrical system 56, a hydraulic system 58, and an environmental system 60. Any number of other systems may be included. Although an aerospace example is shown, the principles of the disclosure may be applied to other industries, such as the automotive industry, including automotive vehicles, the marine industry, including watercraft, ships, and submarines, and other suitable industries.

Methods and systems embodied herein may be employed during any one or more of the stages of the aircraft manufacturing and service method 30 (see FIG. 2). For example, components or subassemblies corresponding to component and subassembly manufacturing 36 (see FIG. 2) may be fabricated or manufactured in a manner similar to components or subassemblies produced while the aircraft 46 (see FIG. 3) is in service 42 (see FIG. 2). Also, one or more method embodiments, system embodiments, or a combination thereof, may be utilized during component and subassembly manufacturing 36 (see FIG. 2) and system integration 38 (see FIG. 2), for example, by substantially expediting assembly of, or reducing the cost of, the aircraft 46 (see FIG. 3). Similarly, one or more of method embodiments, system embodiments, or a combination thereof, may be utilized while the aircraft 46 (see FIG. 3) is in service 42 (see FIG. 2), for example and without limitation, to maintenance and service 44 (see FIG. 2).

Figure 4A:
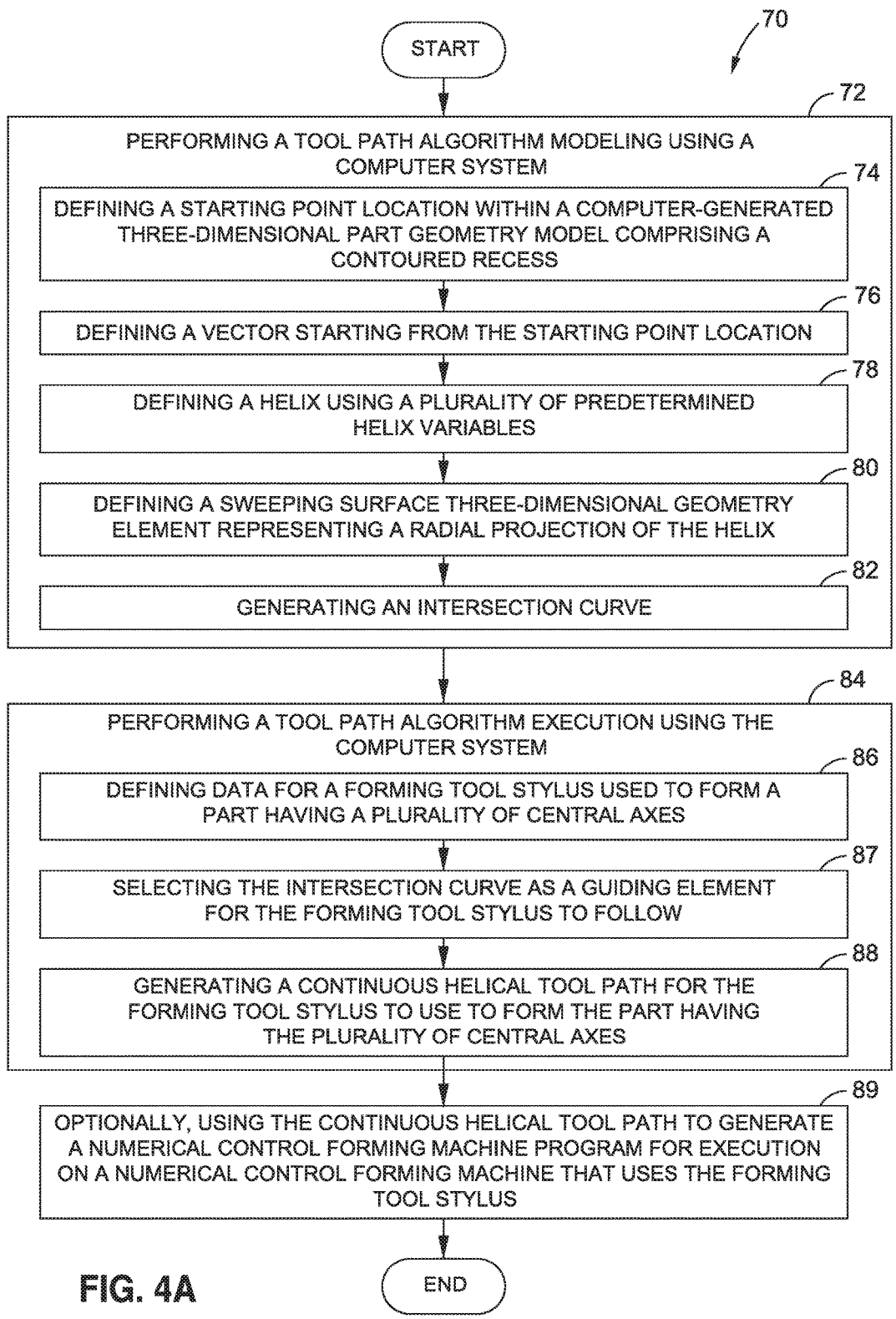
FIG. 4A is an illustration of a flow diagram showing an exemplary embodiment of a method of the disclosure.

Now referring to FIG. 4A, in one embodiment, there is provided a method 70, that is computer-implemented, for generating a continuous helical tool path 170 (see FIGS. 6, 17) for forming a part 10 (see FIGS. 6, 7) having a plurality of central axes 122 (see FIGS. 6, 7) or multiple central axes. A central axis may also be referred to herein as a "neutral axis". FIG. 4A is an illustration of a flow diagram showing an exemplary embodiment of the computer-implemented method 70 of the disclosure. The part 10 (see FIG. 7) that is formed is preferably a sheet metal part 10a (see FIG. 7) and is discussed in further detail below with respect to FIG. 7.

Figure 6:
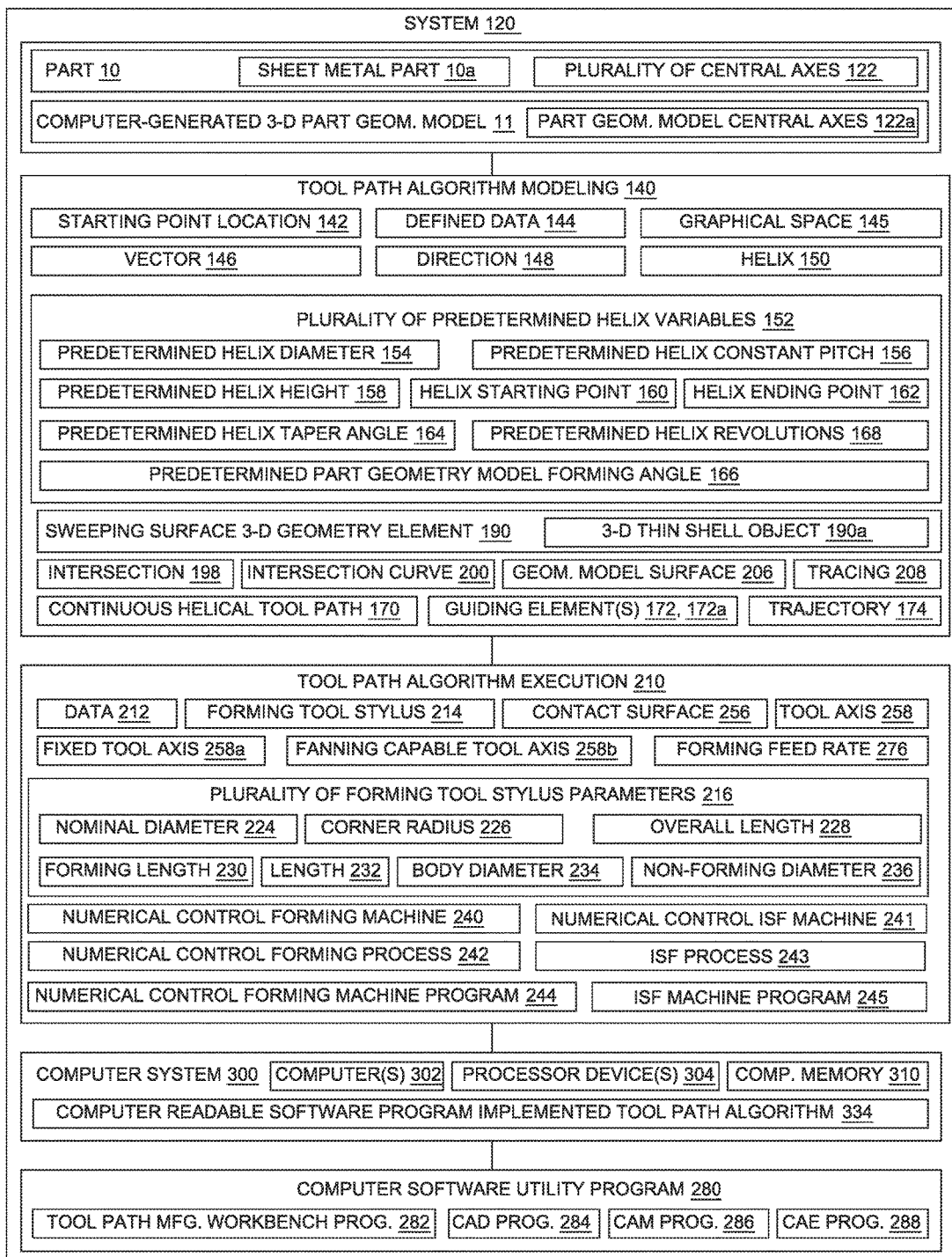
FIG. 6 is an illustration of a functional block diagram of an exemplary embodiment of a system of the disclosure.
Figure 22:
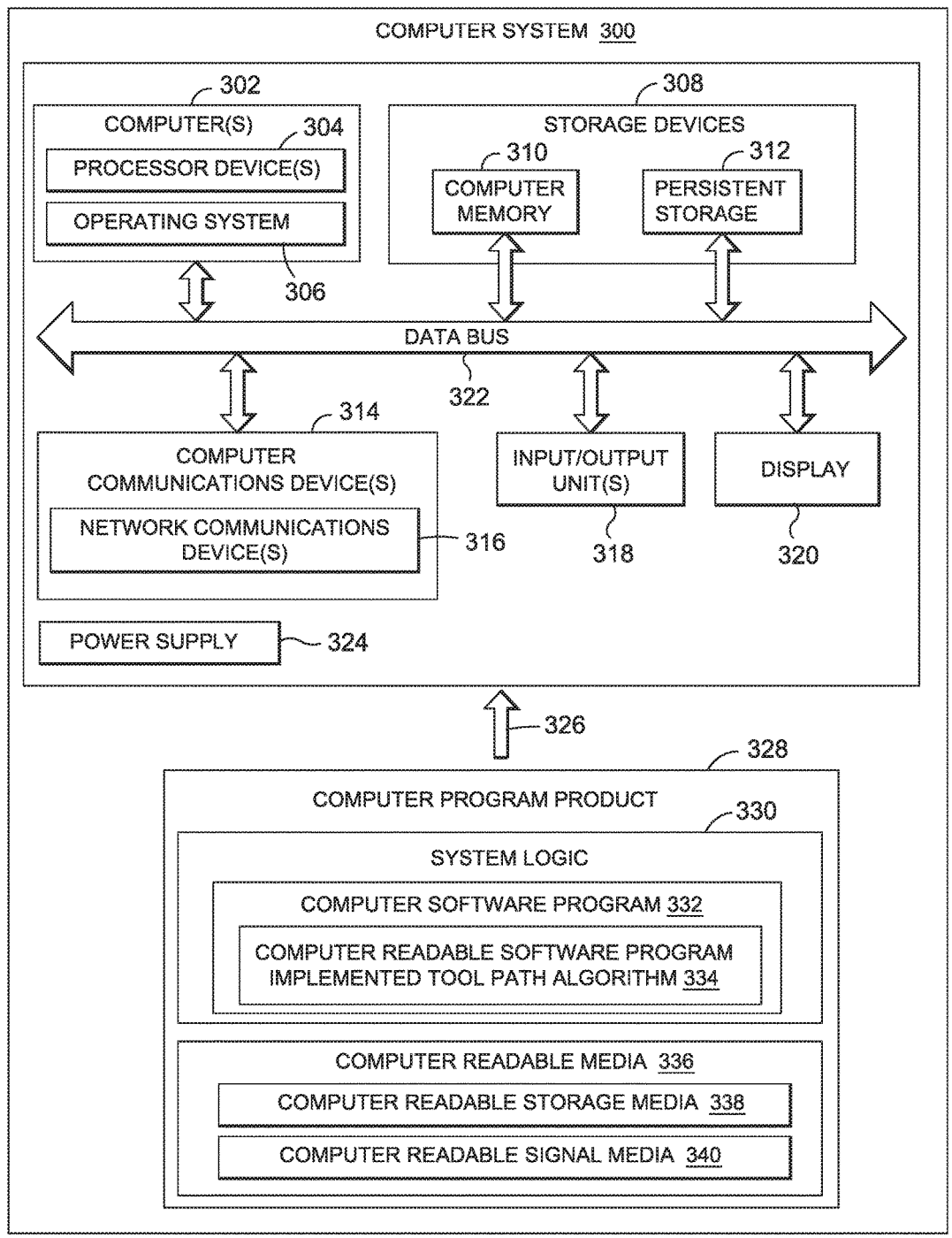
FIG. 22 is an illustration of a functional block diagram showing an exemplary embodiment of a computer system that may be used with one or more embodiments of the methods and systems of the disclosure.

As shown in FIG. 4A, the computer-implemented method 70 comprises step 72 of performing a tool path algorithm modeling 140 (see FIG. 6) using a computer system 300 (see FIGS. 6, 22). The step 72 (see FIG. 4A) of performing the tool path algorithm modeling 140 (see FIG. 6) is performed using the computer system 300 (see FIGS. 6, 22). Preferably, the computer system 300 (see FIGS. 6, 22) comprises at least a computer 302 (see FIGS. 6, 22), a processor device 304 (see FIGS. 6, 22) for executing one or more functions of the computer 302 (see FIGS. 6, 22), a computer memory 310 (see FIGS. 6, 22), and a computer readable software program implemented tool path algorithm 334 (see FIGS. 6, 22) configured for use with the computer 302 (see FIGS. 6, 22) and the processor device 304 (see FIGS. 6, 22). The computer system 300 (see FIG. 22) is discussed in further detail below with respect to FIG. 22.

Figure 8:
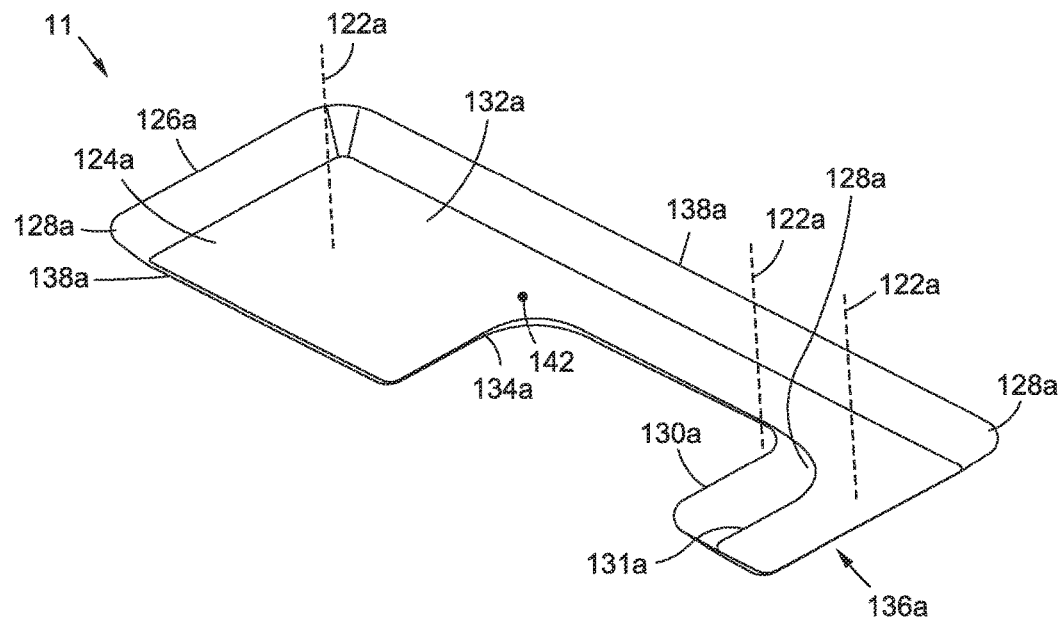
FIG. 8 is an illustration of a top perspective view of an exemplary computer-generated three-dimensional part geometry model showing a starting point location within the computer-generated three-dimensional part geometry model.

As shown in FIG. 4A, step 72 of performing the tool path algorithm modeling 140 (see FIG. 6) comprises substep 74 of defining a starting point location 142 (see FIG. 8) within a computer-generated three-dimensional part geometry model 11 (see FIG. 8). The starting point location 142 (see FIG. 8) is a controlling factor of the location where defined data 144 (see FIG. 6) revolves in graphical space 145 (see FIG. 6). The computer-generated three-dimensional part geometry model 11 (see FIG. 8) comprises a contoured recess 124a (see FIG. 8) having a periphery 126a (see FIG. 8) that includes a plurality of curvature surfaces 128a (see FIG. 8) respectively associated with a plurality of part geometry model central axes 122a (see FIG. 8). The computer-generated three-dimensional part geometry model 11 (see FIG. 8) is discussed in further detail below with respect to FIG. 8.

Figure 9:
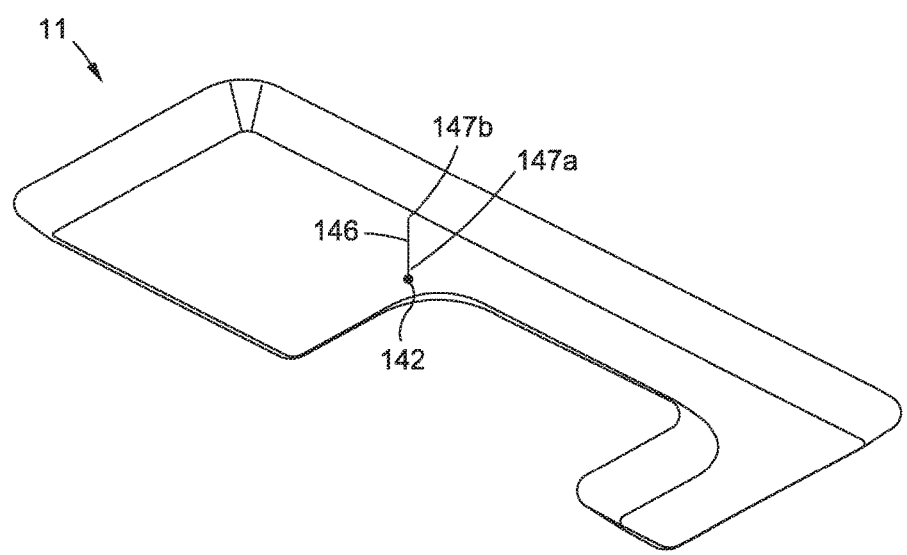
FIG. 9 is an illustration of a top perspective view of the exemplary computer-generated three-dimensional part geometry model of FIG. 8 showing a vector starting from the starting point location within the computer-generated three-dimensional part geometry model.

As shown in FIG. 4A, step 72 of performing the tool path algorithm modeling 140 (see FIG. 6) further comprises substep 76 of defining a vector 146 (see FIG. 9) starting from the starting point location 142 (see FIG. 9). The vector 146 (see FIG. 9) is discussed in further detail below with respect to FIG. 9.

As shown in FIG. 4A, step 72 of performing the tool path algorithm modeling 140 (see FIG. 6) further comprises substep 78 of defining a helix 150 (see FIG. 10A) using a plurality of predetermined helix variables 152 (see FIG. 6). The helix 150 (see FIG. 10A) is defined within the contoured recess 124a of the computer-generated three-dimensional part geometry model 11 (see FIG. 10A) and is revolved around the vector 146 (see FIG. 10A). The helix 150 (see FIGS. 10A-10B) is discussed in further detail below with respect to FIGS. 10A-10B.

Figure 11A:
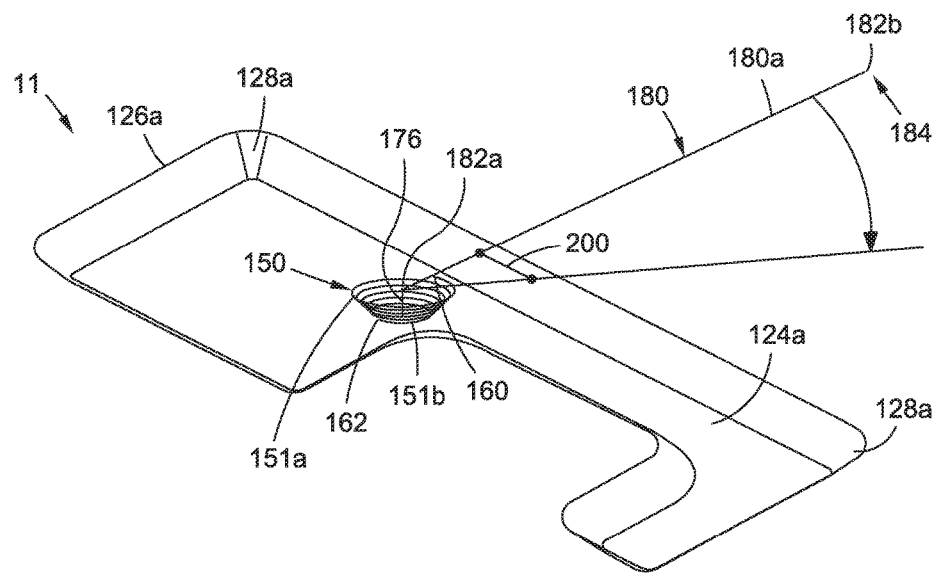
FIG. 11A is an illustration of a top perspective view of the exemplary computer-generated three-dimensional part geometry model of FIG. 10A showing a radial element perpendicular to a helix axial centerline and extending to an exterior area of the computer-generated three-dimensional part geometry model.
Figure 11B:
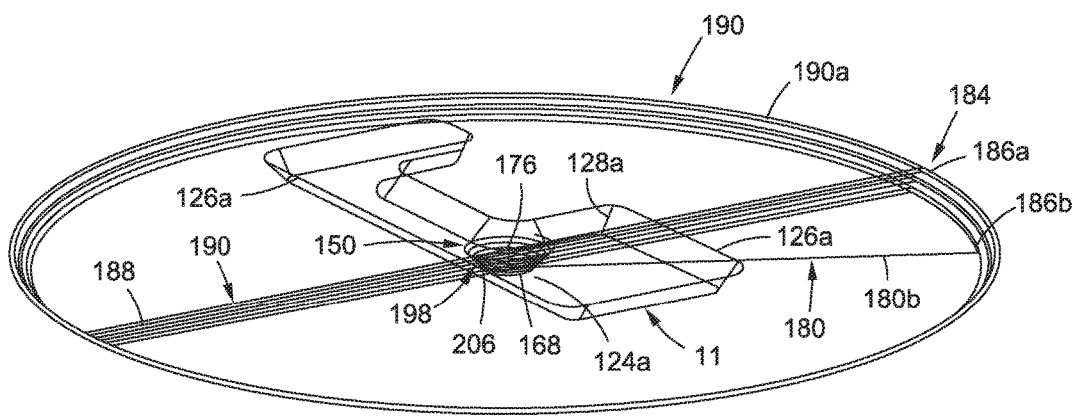
FIG. 11B is an illustration of a top perspective view of the exemplary computer-generated three-dimensional part geometry model of FIG. 11A showing a sweeping surface three-dimensional geometry element intersecting the computer-generated three-dimensional part geometry model.

As shown in FIG. 4A, step 72 of performing the tool path algorithm modeling 140 (see FIG. 6) further comprises substep 80 of defining a sweeping surface three-dimensional geometry element 190 (see FIG. 11B) representing a radial projection 188 (see FIG. 11B) of the helix 150 (see FIG. 11B). The sweeping surface three-dimensional geometry element 190 (see FIG. 11B) extends radially outwardly from the helix axial centerline 176 (see FIG. 11B), through a plurality of predetermined helix revolutions 168 (see FIG. 11B), to an exterior area 184 (see FIG. 11B) that is exterior to the periphery 126a (see FIG. 11B) of the computer-generated three-dimensional part geometry model 11 (see FIG. 11B). The sweeping surface three-dimensional geometry element 190 (see FIG. 11B) is discussed in further detail below with respect to FIG. 11B.

Figure 13:
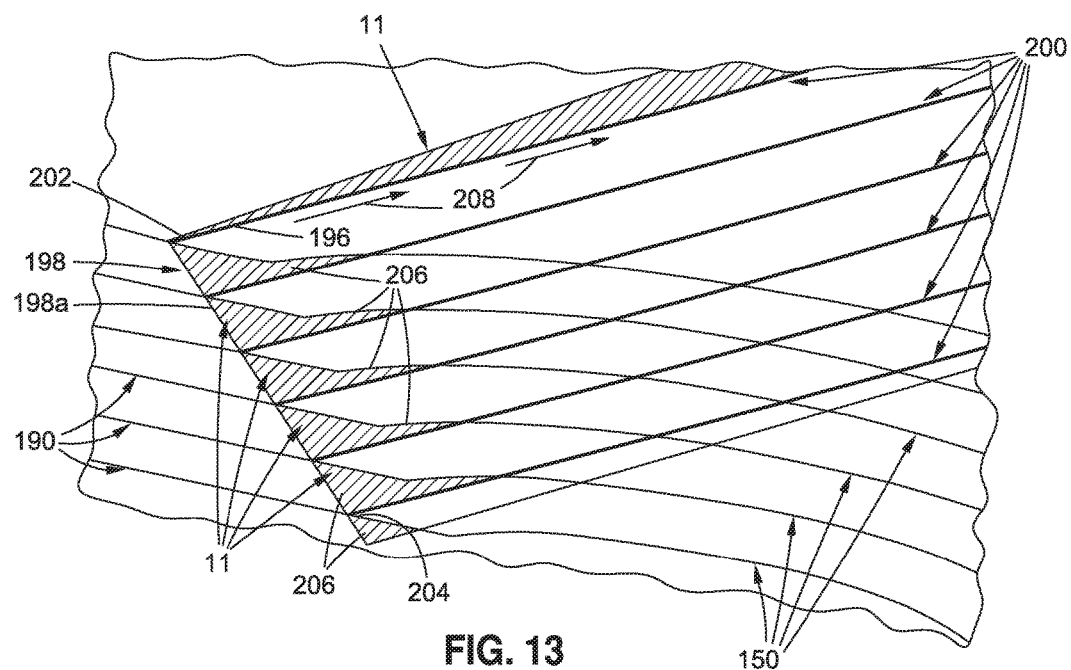
FIG. 13 is an illustration of an enlarged partial view of an intersection between a sweeping surface three-dimensional geometry element and a part geometry model surface of a computer-generated three-dimensional part geometry model.

As shown in FIG. 4A, step 72 of performing the tool path algorithm modeling 140 (see FIG. 6) further comprises substep 82 of generating an intersection curve 200 (see FIG. 13). The intersection curve 200 (see FIG. 13) results from tracing 208 (see FIG. 13) a continuous curved line 196 (see FIG. 13) of an intersection 198 (see FIG. 13), such as a slice 198a (see FIG. 13), between the sweeping surface three-dimensional geometry element 190 (see FIG. 13) and a part geometry model surface 206 (see FIG. 13) of the computer-generated three-dimensional part geometry model 11 (see FIG. 13). The intersection curve 200 (see FIG. 13) is discussed in further detail below with respect to FIG. 13.

As shown in FIG. 4A, the computer-implemented method 70 further comprises step 84 of performing a tool path algorithm execution 210 (see FIG. 6) using the computer system 300 (see FIGS. 6, 22). The step 84 (see FIG. 4A) of performing the tool path algorithm execution 210 (see FIG. 6) is performed using the computer system 300 (see FIGS. 6, 22) comprising at least the computer 302 (see FIGS. 6, 22), the processor device 304 (see FIGS. 6, 22) for executing one or more functions of the computer 302 (see FIGS. 6, 22), the computer memory 310 (see FIGS. 6, 22), and the computer readable software program implemented tool path algorithm 334 (see FIGS. 6, 22) configured for use with the computer 302 (see FIGS. 6, 22) and the processor device 304 (see FIGS. 6, 22).

As shown in FIG. 4A, step 84 of performing the tool path algorithm execution 210 (see FIG. 6) comprises substep 86 of defining data 212 (see FIG. 6) for a forming tool stylus 214 (see FIGS. 6, 15) used to form the part 10 (see FIGS. 6, 7) having the plurality of central axes 122 (see FIGS. 6, 7) or multiple central axes. The forming tool stylus 214 (see FIG. 15) is discussed in further detail below with respect to FIG. 15.

As shown in FIG. 4A, step 84 of performing the tool path algorithm execution 210 (see FIG. 6) further comprises substep 87 of selecting the intersection curve 200 (see FIG. 17) as a guiding element 172a (see FIG. 17) for the forming tool stylus 214 (see FIG. 15) to follow.

Figure 7:
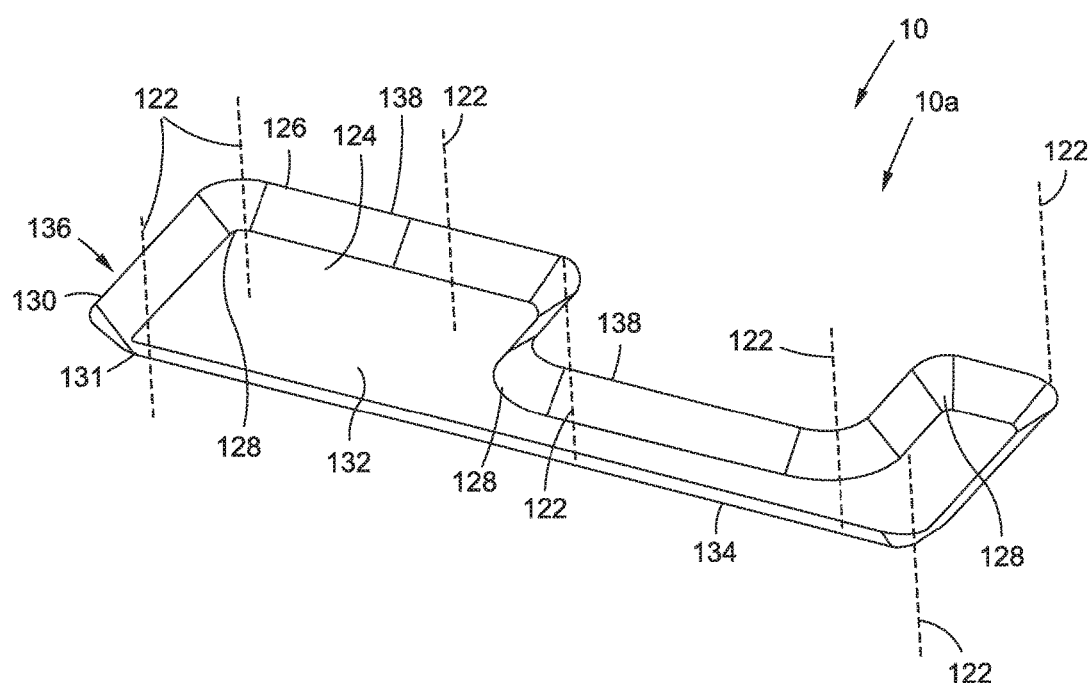
FIG. 7 is an illustration of a top perspective view of an exemplary part with a plurality of central axes that may be formed using one or more embodiments of the methods and systems of the disclosure.

As shown in FIG. 4A, step 84 of performing the tool path algorithm execution 210 (see FIG. 6) further comprises substep 88 of generating the continuous helical tool path 170 (see FIG. 17) for the forming tool stylus 214 (see FIG. 15) to use to form the part 10 (see FIG. 7) having the plurality of central axes 122 (see FIG. 7). The continuous helical tool path 170 (see FIG. 17) is discussed in further detail below with respect to FIG. 17. The part 10 (see FIG. 7) is based on the computer-generated three-dimensional part geometry model 11 (see FIGS. 8, 21), and the continuous helical tool path 170 (see FIG. 17) includes a forming tool stylus centerline path 278 (see FIG. 21) in graphical space 145 (see FIG. 21).

As shown in FIG. 4A, the method 70 may further optionally comprise step 89 of using the continuous helical tool path 170 (see FIGS. 6, 17) to generate the numerical control forming machine program 244 (see FIG. 6), for execution on the numerical control forming machine 240 (see FIGS. 6, 16), that uses the numerical control forming process 242 (see FIG. 6) and the forming tool stylus 214 (see FIGS. 6, 16), to form the part 10 (see FIGS. 6, 7, 16) having the plurality of central axes 122 (see FIGS. 6, 7) or multiple central (neutral) axes. In one embodiment, the continuous helical tool path 170 (see FIGS. 6, 17) is used to generate the numerical control forming machine program 244 (see FIG. 6) comprising an incremental sheet forming (ISF) machine program 245 (see FIG. 6), for execution on the numerical control forming machine 240 (see FIG. 6) comprising a numerical control incremental sheet forming (ISF) machine 241 (see FIGS. 6, 16), that uses the numerical control forming process 242 (see FIG. 6) comprising an incremental sheet forming (ISF) process 243 (see FIG. 6), and the forming tool stylus 214 (see FIGS. 6, 16) to form the part 10 (see FIGS. 6, 7, 16) having the plurality of central axes 122 (see FIGS. 6, 7) or multiple central axes.

The numerical control forming machine program 244 (see FIG. 6) may be generated from the continuous helical tool path 170 (see FIGS. 6, 17) and the computer-generated three-dimensional part geometry model 11 (see FIG. 17), and the numerical control forming machine program 244 (see FIG. 6) includes instructions for the numerical control forming machine 240 (see FIGS. 6, 16), such as the numerical control incremental sheet forming (ISF) machine 241 (see FIGS. 6, 16), for moving the forming tool stylus 214 (see FIGS. 15, 16) along the continuous helical tool path 170 (see FIGS. 6, 17), or defined revolving tool path, at a forming feed rate 276 (see FIG. 6) that is predetermined. The computer 302 (see FIG. 6) and the processor device 304 (see FIG. 6) of the computer system 300 (see FIG. 6) execute a numerical control forming process 242 (see FIG. 6) that generates output to the numerical control forming machine 240 (see FIG. 6) of the numerical control forming machine program 244 (see FIG. 6) from the continuous helical tool path 170 (see FIGS. 6, 17), or defined revolving tool path, and the computer-generated three-dimensional part geometry model 11 (see FIG. 17).

The method 70 (see FIG. 4A) may further comprise using the continuous helical tool path 170 (see FIGS. 6, 17) with a computer software utility program 280 (see FIG. 6), comprising one of, a tool path manufacturing workbench program 282 (see FIG. 6), a computer aided design (CAD) program 284 (see FIG. 6), a computer aided manufacturing (CAM) program 286 (see FIG. 6), a computer aided engineering (CAE) program 288 (see FIG. 6), or another suitable computer software utility program 280 (see FIG. 6).

Figure 4B:
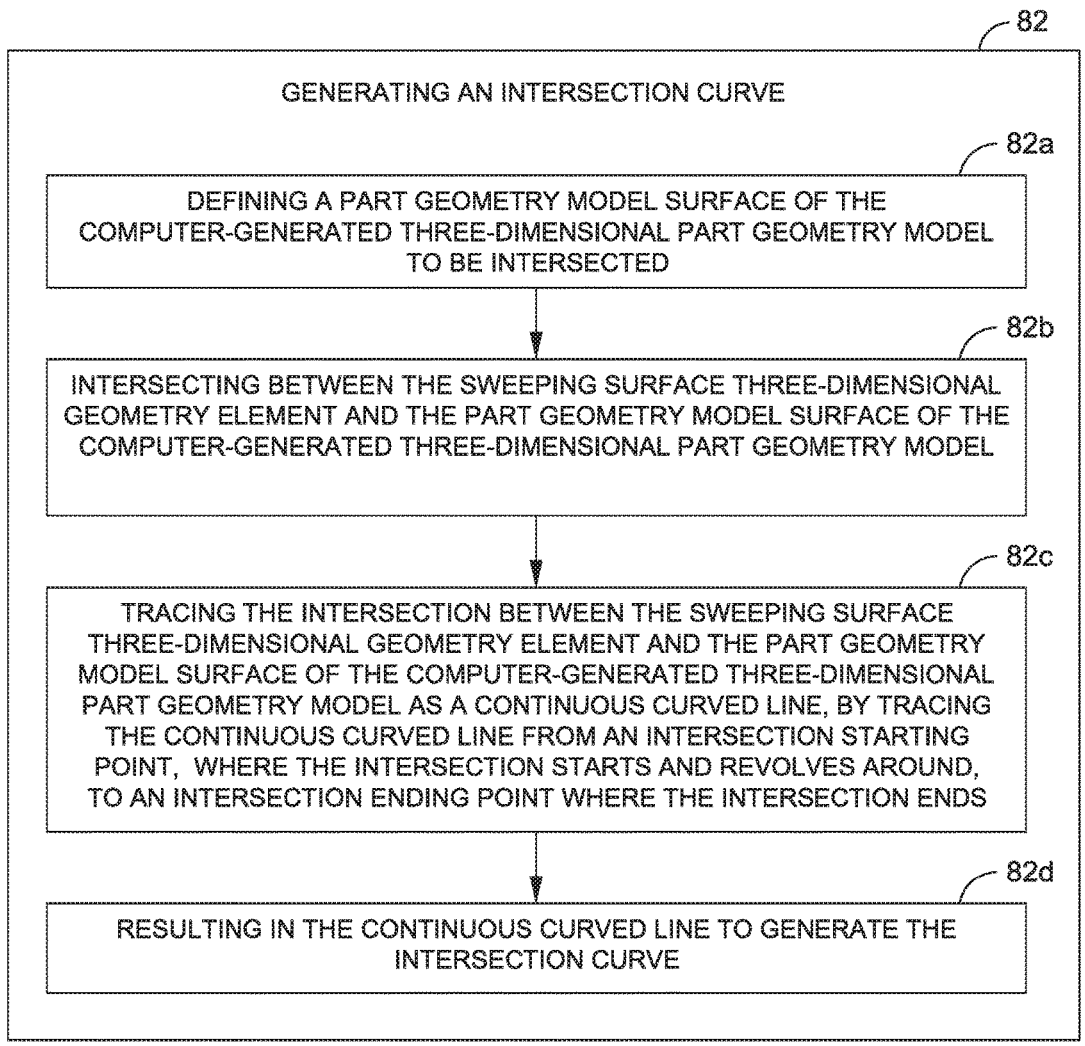
FIG. 4B is an illustration of a flow diagram showing an exemplary embodiment of generating an intersection curve substep of the method of FIG. 4A.

Now referring to FIG. 4B, FIG. 4B is an illustration of a flow diagram showing an exemplary embodiment of substep 82 of generating the intersection curve 200 (see FIG. 13) of the computer-implemented method 70 of FIG. 4A. As shown in FIG. 4B, substep 82 of generating the intersection curve 200 (see FIG. 13) comprises sub-substep 82a of defining a part geometry model surface 206 (see FIG. 13) of the computer-generated three-dimensional part geometry model 11 (see FIG. 13) to be intersected.

As shown in FIG. 4B, substep 82 of generating the intersection curve 200 (see FIG. 13) further comprises sub-substep 82b of intersecting between the sweeping surface three-dimensional geometry element 190 (see FIG. 13) and the part geometry model surface 206 (see FIG. 13) of the computer-generated three-dimensional part geometry model 11 (see FIG. 13).

As shown in FIG. 4B, substep 82 of generating the intersection curve 200 (see FIG. 13) further comprises sub-substep 82c of tracing 208 (see FIG. 13) the intersection 198 (see FIG. 13) between the sweeping surface three-dimensional geometry element 190 (see FIG. 13) and the part geometry model surface 206 (see FIG. 13) of the computer-generated three-dimensional part geometry model 11 (see FIG. 13), as a continuous curved line 196 (see FIG. 13), by tracing 208 (see FIG. 13) the continuous curved line 196 (see FIG. 13) from an intersection starting point 202 (see FIG. 13), where the intersection 198 (see FIG. 13) starts and revolves around, to an intersection ending point 204 (see FIG. 13), where the intersection 198 (see FIG. 13) ends.

As shown in FIG. 4B, substep 82 of generating the intersection curve 200 (see FIG. 13) further comprises sub-substep 82d of resulting in the continuous curved line 196 (see FIG. 13) to generate the intersection curve 200 (see FIG. 13).

Figure 4C:
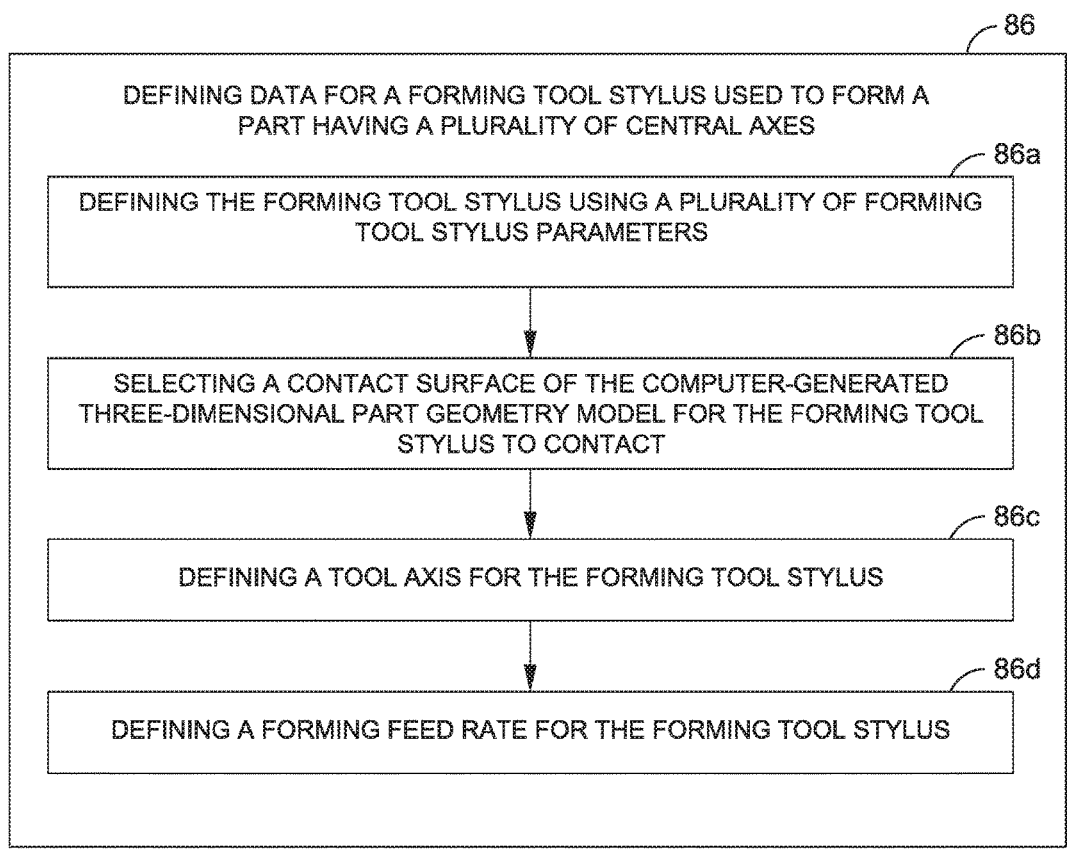
FIG. 4C is an illustration of a flow diagram showing an exemplary embodiment of defining data for a forming tool stylus substep of the method of FIG. 4A.
Figure 15:
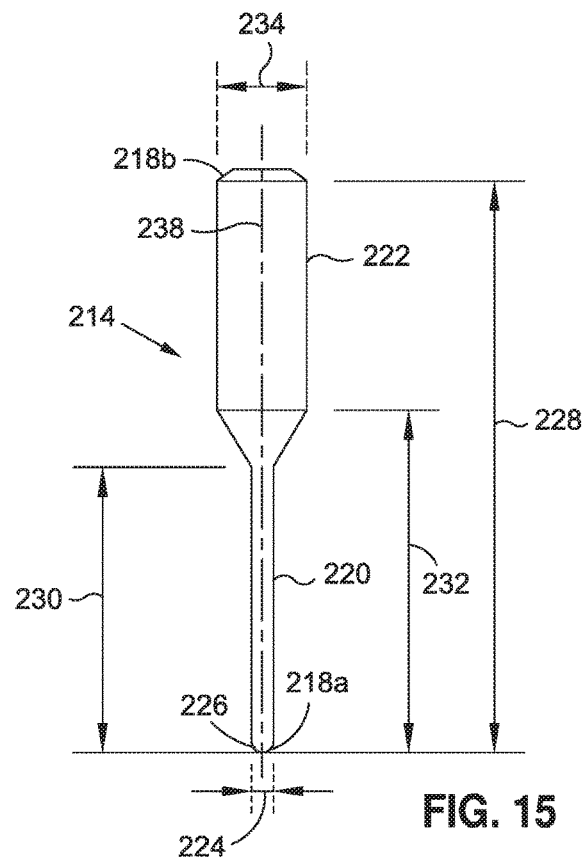
FIG. 15 is an illustration of a front view of an exemplary forming tool stylus that may be used with one or more embodiments of the methods and systems of the disclosure.

Now referring to FIG. 4C, FIG. 4C is an illustration of a flow diagram showing an exemplary embodiment of substep 86 of the method 70 (see FIG. 4A) of defining data 212 (see FIG. 6) for the forming tool stylus 214 (see FIGS. 6, 15). As shown in FIG. 4C, substep 86 of defining data 212 for the forming tool stylus 214 (see FIGS. 6, 15) comprises sub-substep 86a of defining the forming tool stylus 214 (see FIGS. 6, 15) using a plurality of forming tool stylus parameters 216 (see FIG. 6), discussed in further detail below with respect to FIG. 15.

As shown in FIG. 4C, substep 86 of defining data 212 (see FIG. 6) for the forming tool stylus 214 (see FIGS. 6, 15) further comprises sub-substep 86b of selecting a contact surface 256 (see FIG. 18), such as on a curvature surface 128a (see FIG. 18), of the computer-generated three-dimensional part geometry model 11 (see FIG. 18), for the forming tool stylus 214 (see FIG. 15) to contact. The contact surface 256 (see FIG. 18) is discussed in further detail below with respect to FIG. 18.

Figure 19A:
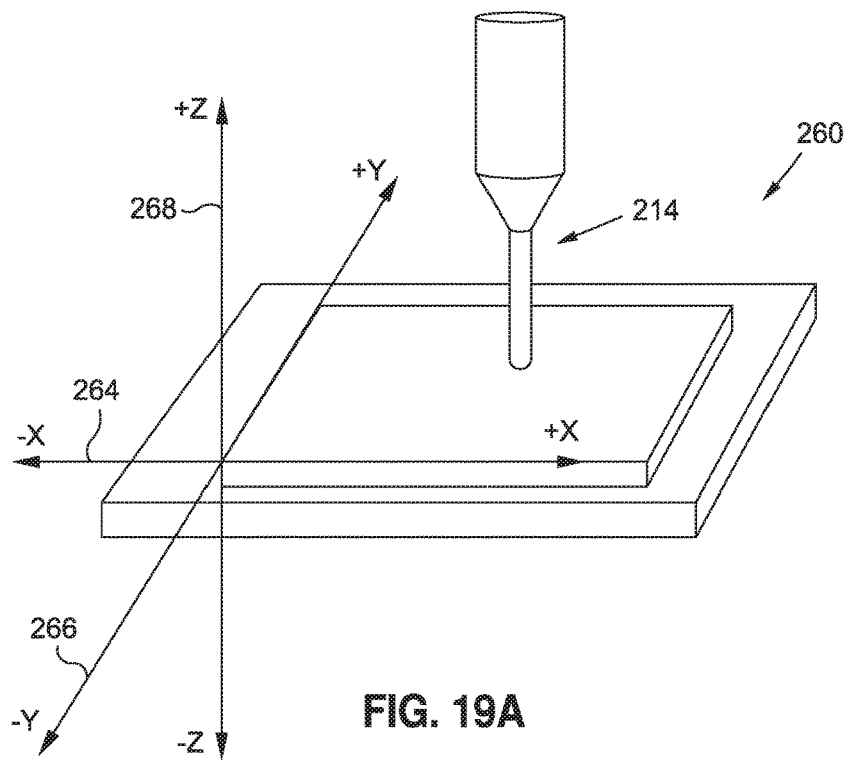
FIG. 19A is a schematic diagram of a 3-axis machine tool that may be used with one or more embodiments of the methods and systems of the disclosure.
Figure 19B:
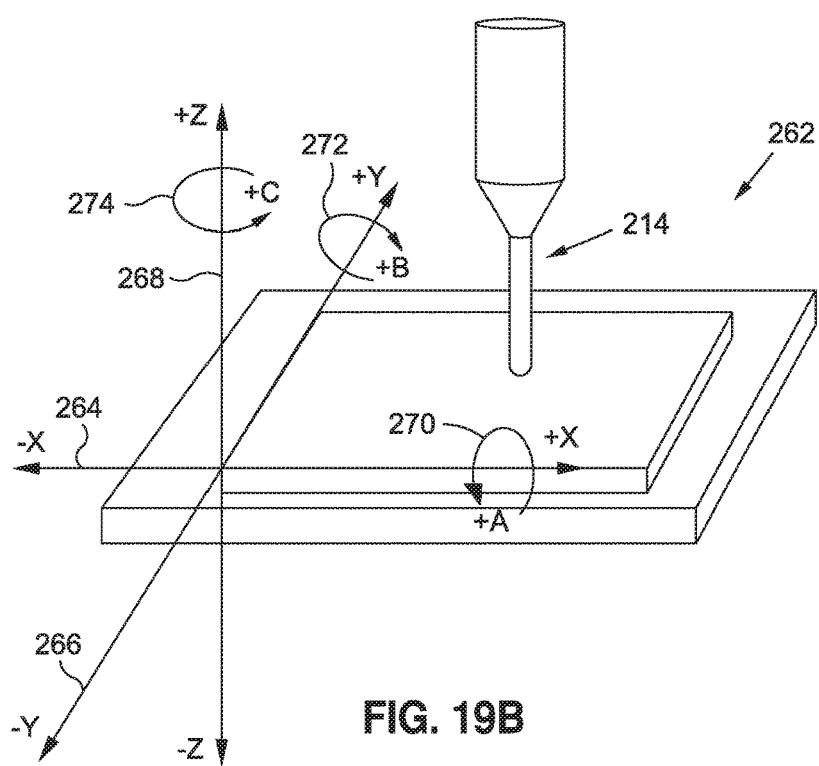
FIG. 19B is a schematic diagram of a 5-axis machine tool that may be used with one or more embodiments of the methods and systems of the disclosure.

As shown in FIG. 4C, substep 86 of defining data 212 (see FIG. 6) for the forming tool stylus 214 (see FIGS. 6, 19A-19B) further comprises sub-substep 86c of defining a tool axis 258 (see FIG. 6) for the forming tool stylus 214 (see FIGS. 6, 19A-19B). Defining the tool axis 258 (see FIG. 6) of the forming tool stylus 214 (see FIGS. 6, 19A-19B) using a 3-axis machine tool 260 (see FIG. 19A) or a 5-axis machine tool 262 (see FIG. 19B) is discussed in further detail below with respect to FIGS. 19A-19B.

Figure 20:
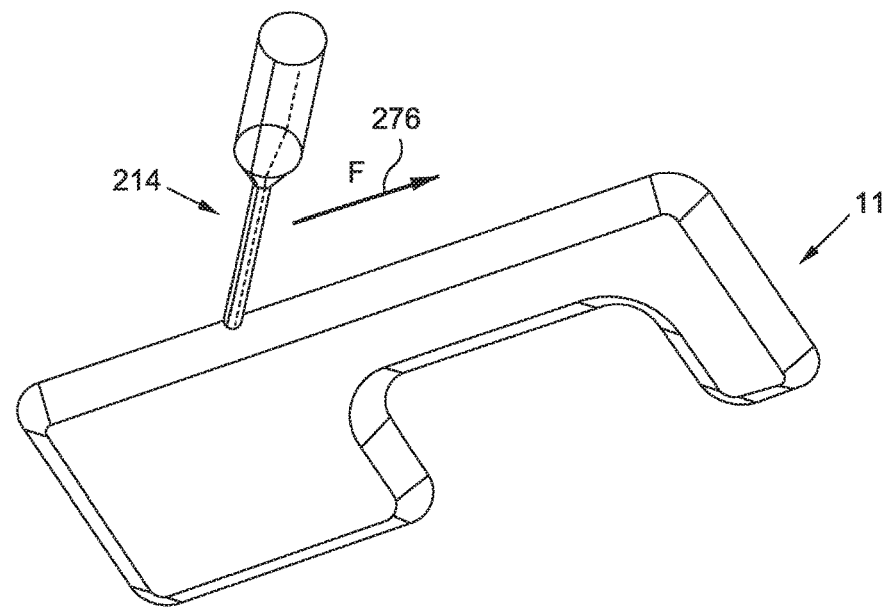
FIG. 20 is an illustration of a top perspective view of an exemplary computer-generated three-dimensional part geometry model showing a forming feed rate for a forming tool stylus.

As shown in FIG. 4C, substep 86 of defining data 212 (see FIG. 6) for the forming tool stylus 214 (see FIGS. 6, 20) further comprises sub-substep 86d of defining a forming feed rate 276 (see FIGS. 6, 20) for the forming tool stylus 214 (see FIGS. 6, 20). The forming feed rate 276 (see FIG. 20) is discussed in further detail below with respect to FIG. 20.

Figure 5A:
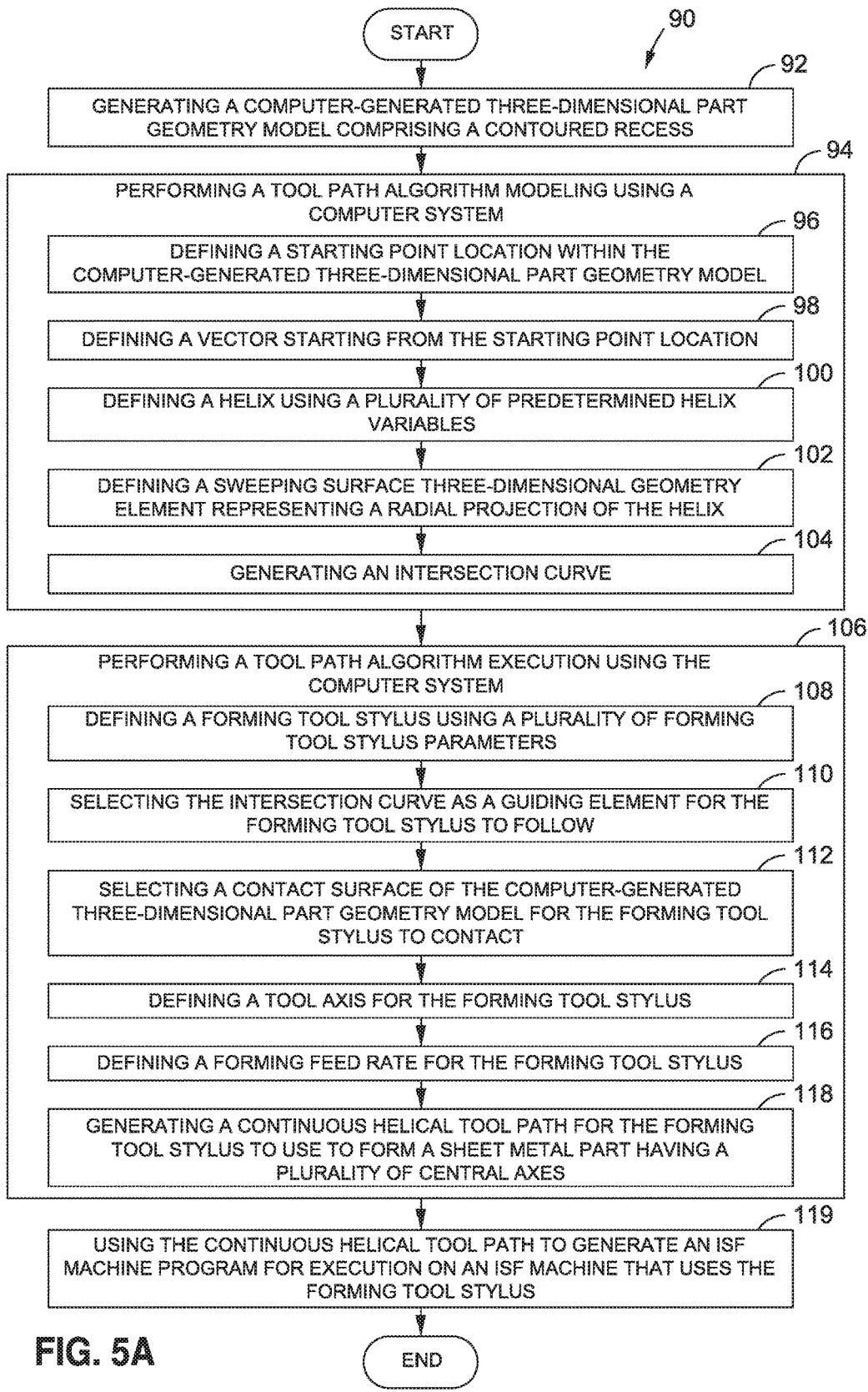
FIG. 5A is an illustration of a flow diagram showing another exemplary embodiment of a method of the disclosure.

Now referring to FIG. 5A, in another embodiment, there is provided a method 90, that is computer-implemented, for generating a continuous helical tool path 170 (see FIGS. 6, 17) to form a sheet metal part 10a (see FIGS. 6, 7) having a plurality of central axes 122 (see FIGS. 6, 7) or multiple central axes. The central axis may also be referred to herein as the "neutral axis". FIG. 5A is an illustration of a flow diagram showing another exemplary embodiment of a method 90 of the disclosure.

As shown in FIG. 5A, the computer-implemented method 90 comprises step 92 of generating a computer-generated three-dimensional part geometry model 11 (see FIG. 8). The computer-generated three-dimensional part geometry model 11 (see FIG. 8) comprises a contoured recess 124a (see FIG. 8) having a periphery 126a (see FIG. 8) that includes a plurality of curvature surfaces 128a (see FIG. 8) respectively associated with a plurality of part geometry model central axes 122a (see FIG. 8). The computer-generated three-dimensional part geometry model 11 (see FIG. 8) is discussed in further detail below with respect to FIG. 8.

As shown in FIG. 5A, the computer-implemented method 90 further comprises step 94 of performing a tool path algorithm modeling 140 (see FIG. 6) using a computer system 300 00 (see FIGS. 6, 22). The computer system 300 00 (see FIGS. 6, 22) comprises at least a computer 302 (see FIGS. 6, 22), a processor device 304 (see FIGS. 6, 22) for executing one or more functions of the computer 302 (see FIGS. 6, 22), and a computer readable software program implemented tool path algorithm 334 (see FIGS. 6, 22) configured for use with the computer 302 (see FIGS. 6, 22) and the processor device 304 (see FIGS. 6, 22). The computer system 300 (see FIG. 22) is discussed in further detail below with respect to FIG. 22.

As shown in FIG. 5A, step 94 of performing the tool path algorithm modeling 140 (see FIG. 6) comprises substep 96 of defining a starting point location 142 (see FIG. 8) within the computer-generated three-dimensional part geometry model 11 (see FIG. 8). The starting point location 142 (see FIG. 8) is a controlling factor of the location where defined data 144 (see FIG. 6) revolves in graphical space 145 (see FIG. 6). The computer-generated three-dimensional part geometry model 11 (see FIG. 8) comprises the contoured recess 124a (see FIG. 8) having the periphery 126a (see FIG. 8) that includes the plurality of curvature surfaces 128a (see FIG. 8) respectively associated with the plurality of part geometry model central axes 122a (see FIG. 8). The computer-generated three-dimensional part geometry model 11 (see FIG. 8) is discussed in further detail below with respect to FIG. 8.

As shown in FIG. 5A, step 94 of performing the tool path algorithm modeling 140 (see FIG. 6) further comprises substep 98 of defining a vector 146 (see FIG. 9) starting from the starting point location 142 (see FIG. 9). The vector 146 (see FIG. 9) is discussed in further detail below with respect to FIG. 9.

As shown in FIG. 5A, step 94 of performing the tool path algorithm modeling 140 (see FIG. 6) further comprises substep 100 of defining a helix 150 (see FIG. 10A) using a plurality of predetermined helix variables 152 (see FIG. 6). The helix 150 (see FIG. 10A) is defined within the contoured recess 124a (see FIG. 8) of the computer-generated three-dimensional part geometry model 11 (see FIG. 10A) and is revolved around the vector 146 (see FIG. 10A). The helix 150 (see FIGS. 10A-10B) is discussed in further detail below with respect to FIGS. 10A-10B.

As shown in FIG. 5A, step 94 of performing the tool path algorithm modeling 140 (see FIG. 6) further comprises substep 102 of defining a sweeping surface three-dimensional geometry element 190 (see FIG. 11B) representing a radial projection 188 (see FIG. 11B) of the helix 150 (see FIG. 11B). The sweeping surface three-dimensional geometry element 190 (see FIG. 11B) extends radially outwardly from the helix axial centerline 176 (see FIG. 11B), through the plurality of predetermined helix revolutions 168 (see FIG. 11B), to the exterior area 184 (see FIG. 11B) that is exterior to the periphery 126a (see FIG. 11B) of the computer-generated three-dimensional part geometry model 11 (see FIG. 11B). The sweeping surface three-dimensional geometry element 190 (see FIG. 11B) is discussed in further detail below with respect to FIG. 11B.

As shown in FIG. 5A, step 94 of performing the tool path algorithm modeling 140 (see FIG. 6) further comprises substep 104 of generating an intersection curve 200 (see FIG. 13). The intersection curve 200 (see FIG. 13) results from tracing 208 (see FIGS. 6, 13) a continuous curved line 196 (see FIG. 13) of an intersection 198 (see FIG. 13), such as a slice 198a (see FIG. 13), between the sweeping surface three-dimensional geometry element 190 (see FIG. 13) and a part geometry model surface 206 (see FIG. 13) of the computer-generated three-dimensional part geometry model 11 (see FIG. 13). The intersection curve 200 (see FIG. 13) is discussed in further detail below with respect to FIG. 13.

As shown in FIG. 5A, the computer-implemented method 90 further comprises step 106 of performing the tool path algorithm execution 210 (see FIG. 6) using the computer system 300 (see FIG. 22). The step 106 (see FIG. 5A) of performing the tool path algorithm execution 210 (see FIG. 6) is performed using the computer system 300 (see FIG. 22) comprising at least the computer 302 (see FIG. 22), the processor device 304 (see FIG. 22) for executing one or more functions of the computer 302 (see FIG. 22), the computer memory 310 (see FIG. 22), and the computer readable software program implemented tool path algorithm 334 (see FIG. 22) configured for use with the computer 302 (see FIG. 22) and the processor device 304 (see FIG. 22).

As shown in FIG. 5A, step 106 of performing the tool path algorithm execution 210 (see FIG. 6) comprises substep 108 of defining the forming tool stylus 214 (see FIGS. 6, 15) using the plurality of forming tool stylus parameters 216 (see FIG. 6). The plurality of forming tool stylus parameters 216 (see FIG. 15) are discussed in further detail below with respect to FIG. 15.

As shown in FIG. 5A, step 106 of performing the tool path algorithm execution 210 (see FIG. 6) further comprises substep 110 of selecting the intersection curve 200 (see FIG. 17) as the guiding element 172a (see FIG. 17) for the forming tool stylus 214 (see FIG. 15) to follow.

As shown in FIG. 5A, step 106 of performing the tool path algorithm execution 210 (see FIG. 6) further comprises substep 112 of selecting the contact surface 256 (see FIG. 18), such as on the curvature surface 128a (see FIG. 18), of the computer-generated three-dimensional part geometry model 11 (see FIG. 18), for the forming tool stylus 214 (see FIG. 15) to contact. The contact surface 256 (see FIG. 18) is discussed in further detail below with respect to FIG. 18.

As shown in FIG. 5A, step 106 of performing the tool path algorithm execution 210 (see FIG. 6) further comprises substep 114 of defining the tool axis 258 (see FIG. 6) for the forming tool stylus 214 (see FIGS. 6, 19A-19B). Defining the tool axis 258 (see FIG. 6) of the forming tool stylus 214 (see FIGS. 6, 19A-19B) using the 3-axis machine tool 260 (see FIG. 19A) or the 5-axis machine tool 262 (see FIG. 19B) is discussed in further detail below with respect to FIGS. 19A-19B.

As shown in FIG. 5A, step 106 of performing the tool path algorithm execution 210 (see FIG. 6) further comprises substep 116 of defining the forming feed rate 276 (see FIGS. 6, 20) for the forming tool stylus 214 (see FIGS. 6, 20). The forming feed rate 276 (see FIG. 20) is discussed in further detail below with respect to FIG. 20.

As shown in FIG. 5A, step 106 of performing the tool path algorithm execution 210 (see FIG. 6) further comprises substep 118 of generating the continuous helical tool path 170 (see FIG. 17) for the forming tool stylus 214 (see FIG. 15) to use to form the sheet metal part 10a (see FIG. 7) having the plurality of central axes 122 (see FIG. 7) or multiple central axes. The continuous helical tool path 170 (see FIG. 17) is discussed in further detail below with respect to FIG. 17. The sheet metal part 10a (see FIG. 7) is based on the computer-generated three-dimensional part geometry model 11 (see FIGS. 8, 21), and the continuous helical tool path 170 (see FIG. 17) includes the forming tool stylus centerline path 278 (see FIG. 21) in graphical space 145 (see FIG. 21).

As shown in FIG. 5A, the method 90 further comprises step 119 of using the continuous helical tool path 170 (see FIGS. 6, 17) to generate an incremental sheet forming (ISF) machine program 245 (see FIG. 6) for execution on a numerical control incremental sheet forming (ISF) machine 241 (see FIGS. 6, 16) that uses an incremental sheet forming (ISF) process 243 (see FIG. 6) and the forming tool stylus 214 (see FIGS. 6, 16) to form the sheet metal part 10a (see FIGS. 6, 7, 16) having the plurality of central axes 122 (see FIGS. 6, 7) or multiple central axes.

The method 90 (see FIG. 5A) may further comprise using the continuous helical tool path 170 (see FIGS. 6, 17) with the computer software utility program 280 (see FIG. 6) comprising one of, the tool path manufacturing workbench program 282 (see FIG. 6), the computer aided design (CAD) program 284 (see FIG. 6), the computer aided manufacturing (CAM) program 286 (see FIG. 6), the computer aided engineering (CAE) program 288 (see FIG. 6), or another suitable computer software utility program 280 (see FIG. 6).

Figure 5B:
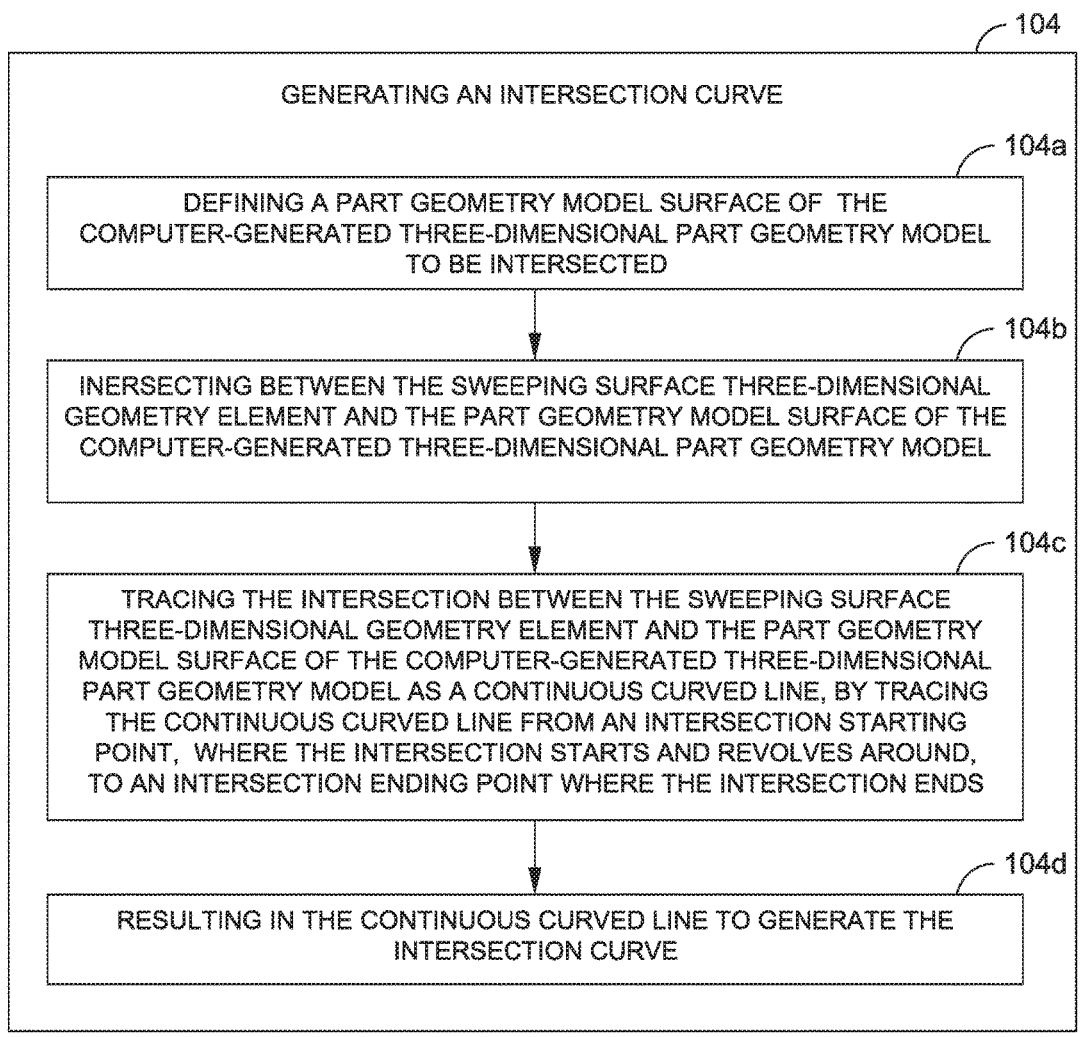
FIG. 5B is an illustration of a flow diagram showing an exemplary embodiment of generating an intersection curve substep of the method of FIG. 5A.

Now referring to FIG. 5B, FIG. 5B is an illustration of a flow diagram showing an exemplary embodiment of substep 104 of generating the intersection curve 200 (see FIG. 13) of the computer-implemented method 90 of FIG. 5A. As shown in FIG. 5B, substep 104 of generating the intersection curve 200 (see FIG. 13) comprises sub-substep 104a of defining the part geometry model surface 206 (see FIG. 13) of the computer-generated three-dimensional part geometry model 11 (see FIG. 13) to be intersected.

As shown in FIG. 5B, substep 104 of generating the intersection curve 200 (see FIG. 13) further comprises sub-substep 104b of intersecting between the sweeping surface three-dimensional geometry element 190 (see FIG. 13) and the part geometry model surface 206 (see FIG. 13) of the computer-generated three-dimensional part geometry model 11 (see FIG. 13).

As shown in FIG. 5B, substep 104 of generating the intersection curve 200 (see FIG. 13) further comprises sub-substep 104c of tracing 208 (see FIG. 13) the intersection 198 (see FIG. 13) between the sweeping surface three-dimensional geometry element 190 (see FIG. 13) and the part geometry model surface 206 (see FIG. 13) of the computer-generated three-dimensional part geometry model 11 (see FIG. 13), as a continuous curved line 196 (see FIG.

13), by tracing 208 (see FIG. 13) the continuous curved line 196 (see FIG. 13) from the intersection starting point 202 (see FIG. 13), where the intersection 198 (see FIG. 13) starts and revolves around, to the intersection ending point 204 (see FIG. 13) where the intersection 198 (see FIG. 13) ends.

As shown in FIG. 5B, substep 104 of generating the intersection curve 200 (see FIG. 13) further comprises sub-substep 104d of resulting in the continuous curved line 196 (see FIG. 13) to generate the intersection curve 200 (see FIG. 13).

Now referring to FIG. 6, FIG. 6 is an illustration of a functional block diagram of an exemplary embodiment of a system 120 of the disclosure, for generating a continuous helical tool path 170 (see also FIG. 17) for forming a part 10 (see also FIG. 7), such as a sheet metal part 10a (see also FIG. 7), having a plurality of central axes 122 (see also FIG. 7) or multiple central axes. The central axis may also be referred to herein as the "neutral axis". The system 120 (see FIG. 6) is preferably computer-implemented.

As shown in FIG. 6, the system 120 comprises a computer-generated three-dimensional part geometry model 11 (see also FIG. 8) comprising a contoured recess 124a (see FIG. 8) having a periphery 126a (see FIG. 8) that includes a plurality of curvature surfaces 128a (see FIG. 8) respectively associated with a plurality of part geometry model central axes 122a (see also FIG. 8). The computer-generated three-dimensional part geometry model 11 (see FIG. 8) is discussed in further detail below with respect to FIG. 8.

As shown in FIG. 6, the system 120 further comprises a computer system 300 (see also FIG. 22) comprising at least one or more computers 302 (see also FIG. 22), one or more processor devices 304 (see also FIG. 22) for executing one or more functions of the computer 302, a computer memory 310 (see also FIG. 22), and a computer readable software program implemented tool path algorithm 334 (see also FIG. 22) configured to perform via the computer 302 and the processor device 304, a tool path algorithm modeling 140 and a tool path algorithm execution 210. The computer system 300 (see FIG. 22) is discussed in further detail below with respect to FIG. 22.

As shown in FIG. 6, the tool path algorithm modeling 140 of the system 120 comprises defining the starting point location 142 within the computer-generated three-dimensional part geometry model 11. The starting point location 142 (see FIG. 6) is a controlling factor of the location where defined data 144 (see FIG. 6) revolves in graphical space 145 (see FIG. 6). The starting point location 142 (see FIGS. 6, 8) is discussed in further detail below with respect to FIG. 8.

As shown in FIG. 6, the tool path algorithm modeling 140 of the system 120 further comprises defining the vector 146 starting from the starting point location 142. The vector 146 (see FIGS. 6, 9) controls a direction 148 (see FIG. 6) of which the defined data 144 (see FIG. 6) revolves around. The vector 146 (see FIGS. 6, 9) is discussed in further detail below with respect to FIG. 9.

As shown in FIG. 6, the tool path algorithm modeling 140 of the system 120 further comprises defining the helix 150 using the plurality of predetermined helix variables 152. The helix 150 (see FIGS. 6, 11A-11B) is defined within the contoured recess 124a (see FIGS. 6, 11A-11B) of the computer-generated three-dimensional part geometry model 11 (see FIGS. 6, 11A-11B) and revolved around the vector 146 (see FIGS. 6, 10B). As shown in FIG. 6, the plurality of predetermined helix variables 152 comprises a predetermined helix diameter 154, a predetermined helix constant pitch 156, a predetermined helix height 158 between a helix starting point 160 and a helix ending point 162, a predetermined helix taper angle 164 or a predetermined part geometry model forming angle 166, the plurality of predetermined helix revolutions 168, or another suitable predetermined helix variable 152. The helix 150 (see FIG. 10B) is discussed in further detail below with respect to FIG. 10B.

Figure 17:
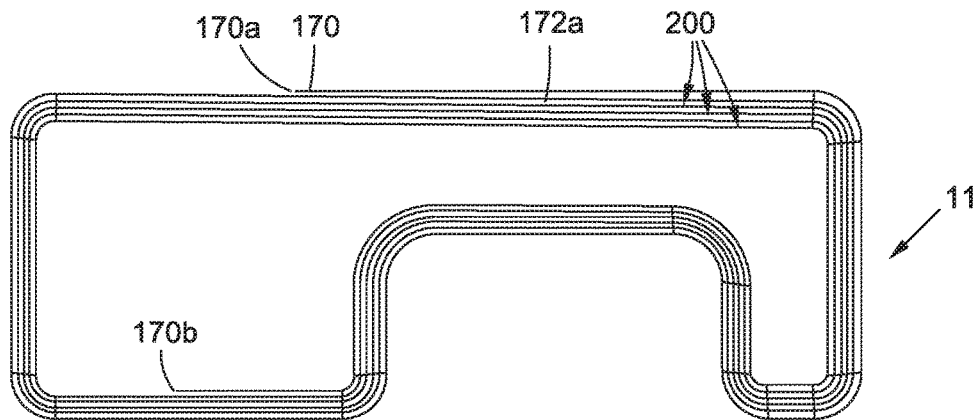
FIG. 17 is an illustration of a top view of an exemplary computer-generated three-dimensional part geometry model showing the intersection curve as a guiding element for a forming tool stylus.

The plurality of predetermined helix variables 152 (see FIG. 6) preferably define a continuous helical tool path 170 (see FIGS. 6, 17) with one or more guiding elements 172, 172a (see FIGS. 6, 17) for a trajectory 174 (see FIG. 6) of the continuous helical tool path 170 (see FIGS. 6, 17).

As shown in FIG. 6, the tool path algorithm modeling 140 of the system 120 further comprises defining a sweeping surface three-dimensional geometry element 190, such as in the form of a three-dimensional thin shell object 190a. The sweeping surface three-dimensional geometry element 190 (see FIG. 6, 11B) represents a radial projection 188 (see FIG. 11B) of the helix 150 (see FIGS. 6, 11B). The sweeping surface three-dimensional geometry element 190 (see FIGS. 6, 11B) extends radially outwardly from a helix axial centerline 176 (see FIG. 11B), through the plurality of predetermined helix revolutions 168 (see FIGS. 6, 11B), to an exterior area 184 (see FIG. 11B) that is exterior to the periphery 126a (see FIG. 11B) of the computer-generated three-dimensional part geometry model 11 (see FIGS. 6, 11B). The sweeping surface three-dimensional geometry element 190 (see FIGS. 6, 11B) is discussed in further detail below with respect to FIG. 11B.

As shown in FIG. 6, the tool path algorithm modeling 140 of the system 120 further comprises generating the intersection curve 200 (see also FIG. 13) resulting from tracing 208 (see also FIG. 13) the continuous curved line 196 (see FIG. 13) of the intersection 198 (see also FIG. 13) between the sweeping surface three-dimensional geometry element 190 (see also FIG. 13) and a part geometry model surface 206 (see also FIG. 13) of the computer-generated three-dimensional part geometry model 11 (see also FIG. 13).

Generating the intersection curve 200 (see FIGS. 6, 13) further preferably comprises defining the part geometry model surface 206 (see FIGS. 6, 13) of the computer-generated three-dimensional part geometry model 11 (see FIGS. 6, 13) to be intersected and intersecting between the sweeping surface three-dimensional geometry element 190 (see FIGS. 6, 13) and the part geometry model surface 206 (see FIGS. 6, 13) of the computer-generated three-dimensional part geometry model 11 (see FIG. 6, 13). Generating the intersection curve 200 (see FIGS. 6, 13) further preferably comprises tracing 208 (see FIGS. 6, 13) the intersection 198 (see FIGS. 6, 13) between the sweeping surface three-dimensional geometry element 190 (see FIGS. 6, 13) and the part geometry model surface 206 (see FIGS. 6, 13) of the computer-generated three-dimensional part geometry model 11 (see FIGS. 6, 13), as a continuous curved line 196 (see FIG. 13), by tracing 208 (see FIGS. 6, 13) the continuous curved line 196 (see FIG. 13) from an intersection starting point 202 (see FIG. 13), where the intersection 198 (see FIGS. 6, 13) starts and revolves around, to an intersection ending point 204 (see FIG. 13), where the intersection 198 (see FIGS. 6, 13) ends. Generating the intersection curve 200 (see FIGS. 6, 13) further preferably comprises resulting in the continuous curved line 196 (see FIG. 13) to generate the intersection curve 200 (see FIGS. 6, 13). The intersection curve 200 (see FIGS. 6, 13) is discussed in further detail below with respect to FIG. 13.

As shown in FIG. 6, the tool path algorithm execution 210 of the system 120 comprises defining data 212 for a forming tool stylus 214 used to form the part 10, such as the sheet metal part 10a, having the plurality of central axes 122 or multiple central axes. Defining data 212 (see FIG. 6) for the forming tool stylus 214 (see FIG. 6) preferably comprises defining the forming tool stylus 214 (see FIG. 6) using a plurality of forming tool stylus parameters 216 (see FIG. 6). As shown in FIG. 6, the plurality of forming tool stylus parameters 216 comprises one or more of, a nominal diameter 224 of the forming tool stylus 214, a corner radius 226 of the forming tool stylus 214, an overall length 228 of the forming tool stylus 214, a forming length 230 of the forming tool stylus 214, a length 232 of the forming tool stylus 214, a body diameter 234 of the forming tool stylus 214, and a non-forming diameter 236 of the forming tool stylus 214.

Defining data 212 (see FIG. 6) for the forming tool stylus 214 (see FIG. 6) preferably further comprises selecting a contact surface 256 (see FIGS. 6, 18) of the computer-generated three-dimensional part geometry model 11 (see FIG. 6) for the forming tool stylus 214 (see FIG. 6) to contact. Defining data 212 (see FIG. 6) for the forming tool stylus 214 (see FIG. 6) preferably further comprises defining a tool axis 258 (see FIG. 6) for the forming tool stylus 214 (see FIG. 6). The tool axis 258 (see FIG. 6) preferably comprises one of, a fixed tool axis 258a (see FIG. 6) in a 3-axis machine tool 260 (see FIG. 19A), a fanning capable tool axis 258b (see FIG. 6) in a 5-axis machine tool 262 (see FIG. 19B), or another suitable tool axis and multi-axis machine tool. Defining data 212 (see FIG. 6) for the forming tool stylus 214 (see FIG. 6) preferably further comprises defining a forming feed rate 276 (see FIGS. 6, 20) for the forming tool stylus 214 (see FIG. 6).

As shown in FIG. 6, the tool path algorithm execution 210 of the system 120 further comprises selecting the intersection curve 200 (see also FIG. 17) as the guiding element 172a (see also FIG. 17) for the forming tool stylus 214 to follow. As shown in FIG. 6, the tool path algorithm execution 210 of the system 120 further comprises generating the continuous helical tool path 170 for the forming tool stylus 214 to use to form the part 10, such as the sheet metal part 10a, having the plurality of central axes 122 or multiple central axes. The part 10 (see FIGS. 6, 7), such as the sheet metal part 10a (see FIGS. 6, 7), is based on the computer-generated three-dimensional part geometry model 11 (see FIGS. 6, 8), and the continuous helical tool path 170 (see FIGS. 6, 21) includes a forming tool stylus centerline path 278 (see FIG. 21) in graphical space 145 (see FIGS. 6, 21).

As shown in FIG. 6, the tool path algorithm execution 210 of the system 120 further comprises generating a numerical control forming machine program 244 from the continuous helical tool path 170, for execution on a numerical control forming machine 240, that uses a numerical control forming process 242 and the forming tool stylus 214, to form the part 10, such as the sheet metal part 10a, having the plurality of central axes 122 or multiple central axes. As further shown in FIG. 6, the numerical control forming machine program 244 preferably comprises an incremental sheet forming (ISF) machine program 245, the numerical control forming machine 240 preferably comprises a numerical control incremental sheet forming (ISF) machine 241, and the numerical control forming process 242 preferably comprises an incremental sheet forming (ISF) process 243.

As shown in FIG. 6, the system 120 may further optionally comprise a computer software utility program 280 used with the continuous helical tool path 170. As further shown in FIG. 6, the computer software utility program 280 comprises one of, a tool path manufacturing workbench program 282, a computer aided design (CAD) program 284, a computer aided manufacturing (CAM) program 286, and a computer aided engineering (CAE) program 288. However, the computer software utility program 280 (see FIG. 6) may also comprise another suitable computer software utility program.

Now referring to FIG. 7, FIG. 7 is an illustration of a top perspective view of an exemplary part 10, such as a sheet metal part 10a, with the plurality of central axes 122 or multiple central (neutral) axes, that may be formed using one or more embodiments of the computer-implemented method 70 (see FIG. 4A), the computer-implemented method 90 (see FIG. 5A), and the system 120 (see FIG. 6) of the disclosure. As shown in FIG. 7, the part 10 that is formed, such as the sheet metal part 10a, comprises the contoured recess 124 having the periphery 126 that includes the plurality of curvature surfaces 128 respectively associated with the plurality of central axes 122 or multiple central axes. As further shown in FIG. 7, the part 10, such as the sheet metal part 10a, comprises a first end 130 or top end, a second end 131 or bottom end, an interior surface 132, an exterior surface 134, and a body 136 with a plurality of sides 138. The design of the part 10 (see FIG. 7), such as the sheet metal part 10a (see FIG. 7), replicates the design of the computer-generated three-dimensional part geometry model 11 (see FIG. 8).

Now referring to FIG. 8, FIG. 8 is an illustration of a top perspective view of an exemplary computer-generated three-dimensional part geometry model 11 showing the starting point location 142 within the computer-generated three-dimensional part geometry model 11. The starting point 142 (see FIG. 8) is the controlling factor of the location where defined data 144 (see FIG. 6) revolves in graphical space 145 (see FIGS. 6, 21). As shown in FIG. 8, the computer-generated three-dimensional part geometry model 11 comprises the contoured recess 124a having the periphery 126a that includes the plurality of curvature surfaces 128a respectively associated with the plurality of part geometry model central axes 122a). As further shown in FIG. 8, the computer-generated three-dimensional part geometry model 11 comprises a first end 130a or top end, a second end 131a or bottom end, an interior surface 132a, an exterior surface 134a, and a body 136a with a plurality of sides 138a.

Now referring to FIG. 9, FIG. 9 is an illustration of a top perspective view of the exemplary computer-generated three-dimensional part geometry model 11 of FIG. 8 showing the vector 146 starting from the starting point location 142 within the computer-generated three-dimensional part geometry model 11. As shown in FIG. 9, the vector 146 has a first end 147a that starts from the starting point location 142 and has a second end 147b. The vector 146 (see FIGS. 6, 9) controls the direction 148 (see FIG. 6) of which the defined data 144 (see FIG. 6) revolves around.

Figure 10A:
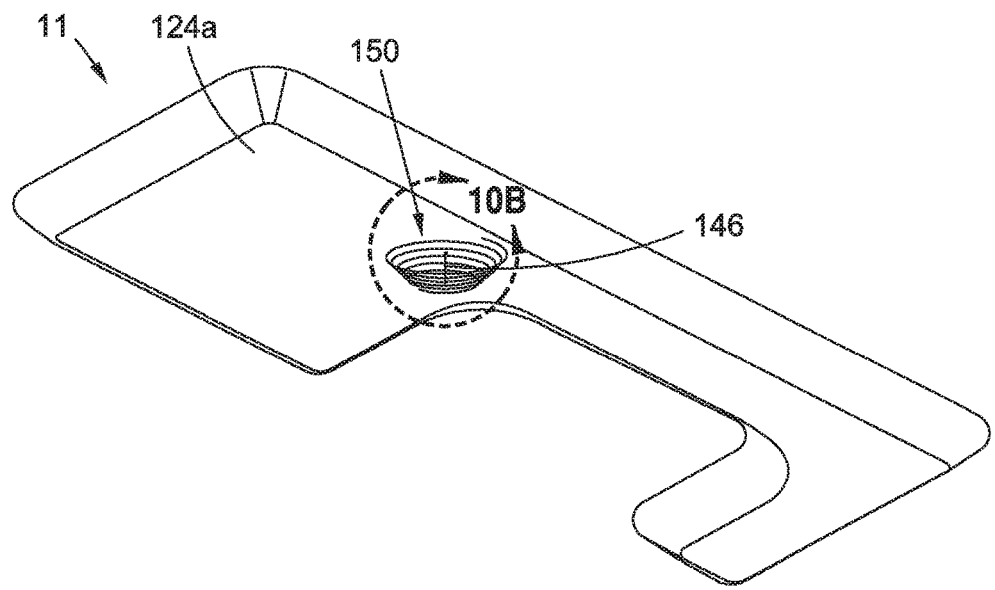
FIG. 10A is an illustration of a top perspective view of the exemplary computer-generated three-dimensional part geometry model of FIG. 9 showing a helix revolved around the vector within the computer-generated three-dimensional part geometry model.

Now referring to FIG. 10A, FIG. 10A is an illustration of a top perspective view of the exemplary computer-generated three-dimensional part geometry model 11 of FIG. 9 showing the helix 150 revolved around the vector 146 and defined within the contoured recess 124a of the computer-generated three-dimensional part geometry model 11.

Figure 10B:
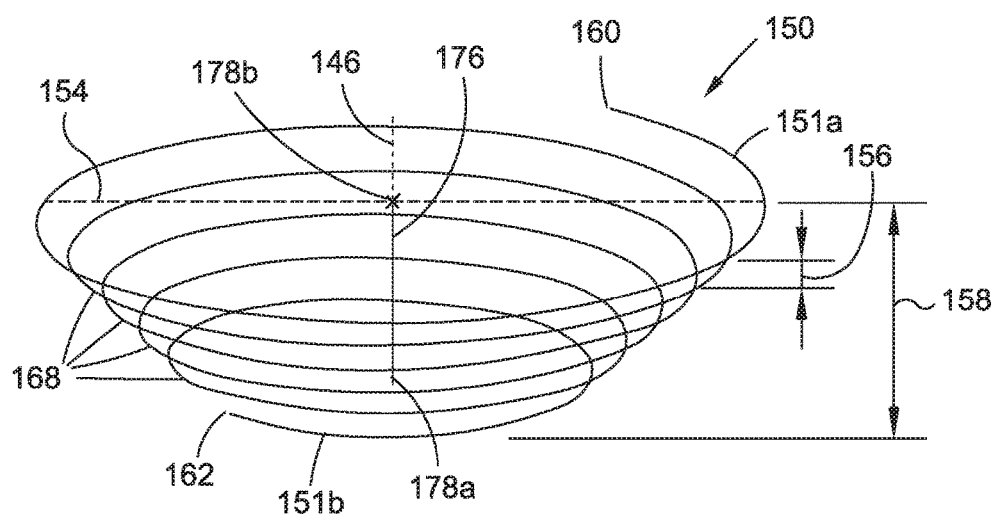
FIG. 10B is an illustration of an enlarged front perspective view of the helix of circle 10B of FIG. 10A.

Now referring to FIG. 10B, FIG. 10B is an illustration of an enlarged front perspective view of the helix 150 of circle 10B of FIG. 10A. As shown in FIG. 10B, the helix 150 has a top end 151a and a bottom end 151b. The helix 150 (see FIGS. 10A-10B) is defined using the plurality of predetermined helix variables 152 (see FIG. 6). As discussed above, the plurality of predetermined helix variables 152 (see FIG. 6) comprises the predetermined helix diameter 154 (see FIGS. 6, 10B), the predetermined helix constant pitch 156

(see FIGS. 6, 10B), the predetermined helix height 158 (see FIGS. 6, 10B) between the helix starting point 160 (see FIGS. 6, 10B) and the helix ending point 162 (see FIGS. 6, 10B), the predetermined helix taper angle 164 (see FIG. 6) or the predetermined part geometry model forming angle 166 (see FIG. 6), and the plurality of predetermined helix revolutions 168 (see FIGS. 6, 10B). The plurality of predetermined helix variables 152 (see FIG. 6) define the continuous helical tool path 170 (see FIGS. 6, 17) with one or more guiding elements 172, 172a (see FIGS. 6, 17) for the trajectory 174 (see FIG. 6) of the continuous helical tool path 170 (see FIGS. 6, 17).

As further shown in FIG. 10B, the helix 150 has a helix axial centerline 176 that is preferably the same as the vector 146, and the vector 146 becomes the helix axial centerline 176 once the helix 150 is formed or defined. The helix axial centerline 176 (see FIG. 10B) has a first end 178a (see FIG. 10B) that is preferably in the same plane as the helix ending point 162 (see FIG. 10B). The helix axial centerline 176 (see FIG. 10B) has a second end 178b (see FIG. 10B) that is preferably in the same plane as the helix starting point 160 (see FIG. 10B).

In an exemplary helix 150 (see FIGS. 6, 10A-10B) that was defined, the plurality of predetermined helix variables 152 (see FIG. 6) were determined or measured and included the following: the predetermined helix diameter 154 (see FIGS. 6, 10B), or desired helix diameter, was 1.1024 inch across the top end 151a (see FIG. 10B) of the helix 150 (see FIG. 10B); the predetermined helix constant pitch 156 (see FIGS. 6, 10B), or the distance between each revolution of the helix 150 (see FIG. 10B), was 0.05 inch; the predetermined helix height 158 (see FIGS. 6, 10B), or desired helix height, between the helix starting point 160 (see FIG. 10B) and the helix ending point 162 (see FIG. 10B) was 0.2784 inch; the predetermined helix taper angle 164 (see FIG. 6) was 45 degrees; and the plurality of predetermined helix revolutions 168 (see FIGS. 6, 10B) or desired number of helix revolutions, was twenty-four (24). However, other suitable measurements of the plurality of predetermined helix variables 152 (see FIG. 6) may be determined or used.

Now referring to FIG. 11A, FIG. 11A is an illustration of a top perspective view of the exemplary computer-generated three-dimensional part geometry model 11 of FIG. 10A showing a radial element 180 perpendicular to the helix axial centerline 176. FIG. 11A shows the helix 150 within the contoured recess 124a of the computer-generated three-dimensional part geometry model 11, and having the helix starting point 160 at the top end 151a of the helix 150 and having the helix ending point 162 at the bottom end 151b of the helix 150.

The radial element 180 (see FIGS. 11A-11B) may comprise a first radial element 180a (see FIG. 11A), a second radial element 180b (see FIG. 11B), and/or other suitable radial elements 180. As shown in FIG. 11A, the radial element 180, such as in the form of first radial element 180a, extends or projects perpendicular to the helix axial centerline 176 that was the vector 146 (see FIG. 10B). As further shown in FIG. 11A, the radial element 180 has a first end 182a starting from the helix axial centerline 176 at the top end 151a of the helix 150, and the radial element 180 has a second end 182b that extends or projects to an exterior area 184 that is exterior to the periphery 126a of the computer-generated three-dimensional part geometry model 11. The radial element 180 (see FIG. 11A), such as in the form of a radius, starts from the helix axial centerline 176 (see FIG. 11A) that was the vector 146 (see FIG. 10B), and extends beyond the extremities of the computer-generated three-dimensional part geometry model 11 (see FIG. 11A). Rotation about the axial centerline 176 (see FIG. 11A) of the radial element 180 (see FIGS. 11A-11B), which projects through the helix 150 (see FIGS. 11A-11B) and intersects the periphery 126a (see FIGS. 11A-11B) of the part geometry model 11 (see FIGS. 11A-11B), may generate an intersection curve 200 (see FIG. 11A) along the periphery 126a (see FIG. 11A) and curvature surfaces 128a (see FIG. 11A), wherein the radial element 180 (see FIG. 11A) follows the profile of the helix 150 (see FIG. 11A) during rotation to create a sweeping surface three-dimensional geometry element 190 (see FIG. 11B) and trace the intersection curve 200 (see FIG. 11A) along the periphery 126a (see FIG. 11A).

Now referring to FIG. 11B, FIG. 11B is an illustration of a top perspective view of the exemplary computer-generated three-dimensional part geometry model 11 of FIG. 11A showing the sweeping surface three-dimensional geometry element 190 intersecting the computer-generated three-dimensional part geometry model 11. The sweeping surface three-dimensional geometry element 190 (see FIG. 11B) preferably comprises a three-dimensional thin shell object 190a (see FIG. 11B) that can intersect or slice the part geometry model surface 206 (see FIG. 11B) in a continuous layer. The form or profile of the sweeping surface three-dimensional geometry element 190 (see FIG. 11B) is established or controlled by the helix 150 (see FIG. 11B) and a radial projection 188 (see FIG. 11B) of the helix 150 (see FIG. 11B).

FIG. 11B shows the helix 150 with the helix axial centerline 176 within the contoured recess 124a of the computer-generated three-dimensional part geometry model 11. As shown in FIG. 11B, the sweeping surface three-dimensional geometry element 190 represents the radial projection 188 of the helix 150 and extends radially outwardly from the helix axial centerline 176 and perpendicular to the helix axial centerline 176, through the plurality of predetermined helix revolutions 168 and through one or more curvature surfaces 128a, to the exterior area 184 that is exterior to the periphery 126a of the computer-generated three-dimensional part geometry model 11, and to a guide curve starting rotation 186a. As further shown in FIG. 11B, the radial element 180, such as in the form of the second radial element 180b, extends radially outwardly from the bottom of the helix 150 to a guide curve ending rotation 186b. The helix axial centerline 176 (see FIG. 11B) that the sweeping surface three-dimensional geometry element 190 (see FIG. 11B) sweeps about is established or defined as the same vector 146 (see FIGS. 6, 9, 10B) that controls the direction 148 (see FIG. 6) of which the defined data 144 (see FIG. 6) revolves around.

The sweeping surface three-dimensional geometry element 190 (see FIG. 11B) acts as an intersecting element between the plurality of predetermined helix variables 152 (see FIG. 6), such as, for example, the plurality of predetermined helix revolutions 168, and the part geometry model surface 206 (see FIG. 11B). An intersection 198 (see FIG. 11B), or slice, is generated or made between the sweeping surface three-dimensional geometry element 190 (see FIG. 11B) and the part geometry model surface 206 (see FIG. 11B) of the computer-generated three-dimensional part geometry model 11.

Figure 12A:
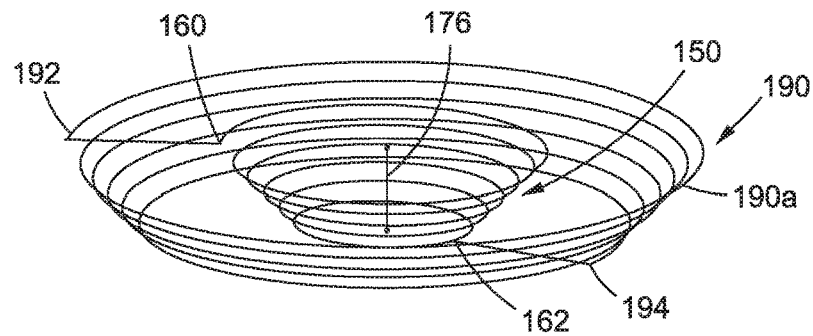
FIG. 12A is an illustration of a perspective view of a sweeping surface three-dimensional geometry element swept around a helix.

Now referring to FIG. 12A, FIG. 12A is an illustration of a perspective view of a sweeping surface three-dimensional geometry element 190, such as in the form of the three-dimensional thin shell object 190a, swept around a helix 150 and a helix axial centerline 176. As shown in FIG. 12A, the sweeping surface three-dimensional geometry element 190 has a sweeping surface starting portion 192 and a sweeping surface ending portion 194. The sweeping surface starting portion 192 (see FIG. 12A) is in the same plane as the helix starting point 160 (see FIG. 12A). The sweeping surface ending portion 194 (see FIG. 12A) is in the same plane as the helix ending point 162 (see FIG. 12A).

Figure 12B:
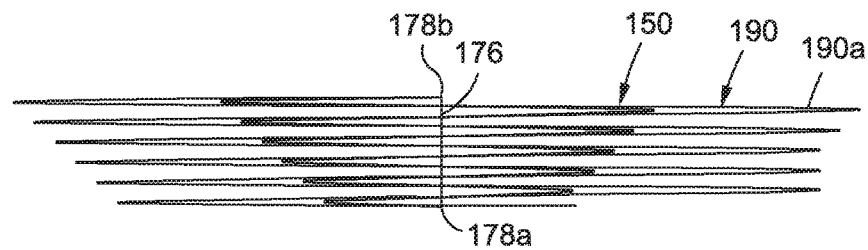
FIG. 12B is an illustration of a front view of the sweeping surface three-dimensional geometry element swept around the helix of FIG. 12A.

Now referring to FIG. 12B, FIG. 12B is an illustration of a front view of the sweeping surface three-dimensional geometry element 190, such as in the form of the three-dimensional thin shell object 190a, swept around the helix 150 and the helix axial centerline 176 of FIG. 12A. As shown in FIG. 12B, the helix 150 and the sweeping surface three-dimensional geometry element 190 are both revolved around the helix axial centerline 176 from the first end 178a to the second end 178b of the helix axial centerline 176.

Figure 12C:
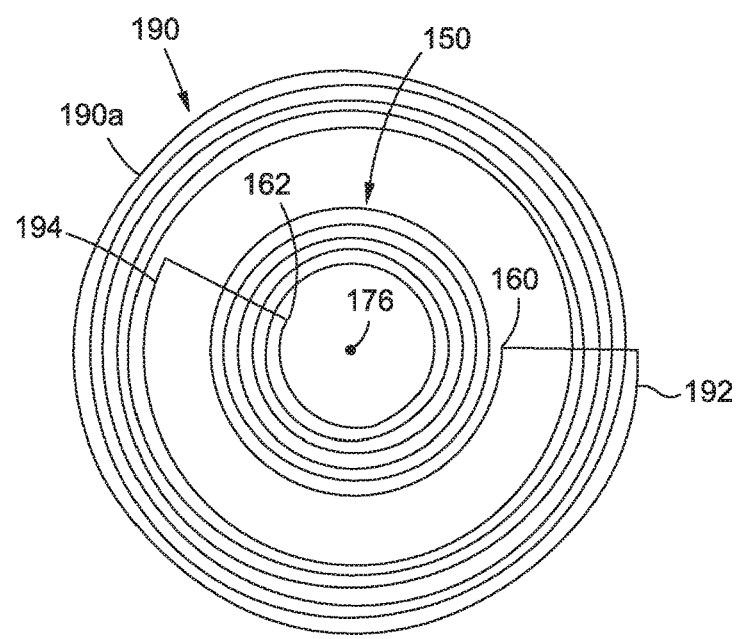
FIG. 12C is an illustration of a top view of the sweeping surface three-dimensional geometry element swept around the helix of FIG. 12A.

Now referring to FIG. 12C, FIG. 12C is an illustration of a top view of the sweeping surface three-dimensional geometry element 190, such as in the form of the three-dimensional thin shell object 190a, swept around the helix 150 and the helix axial centerline 176 of FIG. 12A. As shown in FIG. 12C, the sweeping surface starting portion 192 is in the same plane as the helix starting point 160, and the sweeping surface ending portion 194 is in the same plane as the helix ending point 162.

Now referring to FIG. 13, FIG. 13 is an illustration of an enlarged partial view of an intersection 198, such as in the form of a slice 198a, between a sweeping surface three-dimensional geometry element 190 and a part geometry model surface 206 of the computer-generated three-dimensional part geometry model 11. As shown in FIG. 13, an intersection curve 200 results from tracing 208 a continuous curved line 196 of the intersection 198, such as the slice 198a, between the sweeping surface three-dimensional geometry element 190 and the part geometry model surface 206 of the computer-generated three-dimensional part geometry model 11. FIG. 13 further shows the helix 150.

Generating or defining the intersection curve 200 (see FIG. 13) comprises defining the part geometry model surface 206 (see FIG. 13) of the computer-generated three-dimensional part geometry model 11 (see FIG. 13) to be intersected. Generating or defining the intersection curve 200 (see FIG. 13) further comprises intersecting or slicing between the sweeping surface three-dimensional geometry element 190 (see FIG. 13) and the part geometry model surface 206 (see FIG. 13). Generating or defining the intersection curve 200 (see FIG. 13) further comprises tracing 208 (see FIG. 13) the intersection 198 (see FIG. 13) between the sweeping surface three-dimensional geometry element 190 (see FIG. 13) and the part geometry model surface 206 (see FIG. 13) as the continuous curved line 196, by tracing 208 (see FIG. 13) the continuous curved line 196 (see FIG. 13) from an intersection starting point 202 (see FIG. 13), where the intersection 198 (see FIG. 13) starts and revolves around, to an intersection ending point 204 (see FIG. 13) where the intersection 198 (see FIG. 13) ends. Generating or defining the intersection curve 200 (see FIG. 13) further comprises resulting in the continuous curved line 196 (see FIG. 13) to generate the intersection curve 200 (see FIG. 13).

Thus, the intersection curve 200 (see FIG. 14) function is the result of the intersection 198 (see FIG. 13) of the sweeping surface three-dimensional geometry element 190 (see FIG. 13) and the part geometry model surface 206 (see FIG. 13) of the computer-generated three-dimensional part geometry model 11 (see FIG. 13).

Figure 14:
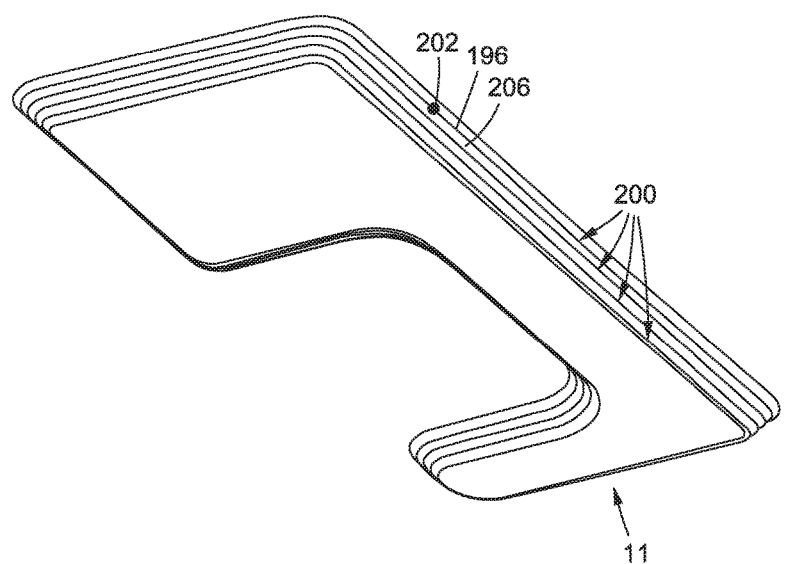
FIG. 14 is an illustration of a top perspective view of an exemplary computer-generated three-dimensional part geometry model showing an intersection curve.

Now referring to FIG. 14, FIG. 14 is an illustration of a top perspective view of an exemplary computer-generated three-dimensional part geometry model 11 showing an intersection curve 200 that has been generated or defined. FIG. 14 shows the intersection starting point 202, the continuous curved line 196, and the part geometry model surface 206. The intersection curve 200 (see FIG. 14) is the traced continuous curved line 196 (see FIG. 14) on the computer-generated three-dimensional part geometry model 11 (see FIG. 14) that is preferably used as the basis for the continuous helical tool path 170 (see FIGS. 6, 17).

Now referring to FIG. 15, FIG. 15 is an illustration of a front view of an exemplary forming tool stylus 214 that may be used with one or more embodiments of the computer-implemented method 70 (see FIG. 4A), the computer-implemented method 90 (see FIG. 5A), and the system 120 (see FIG. 6) of the disclosure. As discussed above, performing the tool path algorithm execution 210 (see FIG. 6) comprises defining data 212 (see FIG. 6) for the forming tool stylus 214 (see FIGS. 6, 15) used to form the part 10 (see FIGS. 6, 7), such as the sheet metal part 10a (see FIGS. 6, 7), having the plurality of central axes 122 (see FIGS. 6, 7) or multiple central axes. Defining data 212 (see FIG. 6) for the forming tool stylus 214 (see FIGS. 6, 15) comprises defining the forming tool stylus 214 (see FIGS. 6, 15) using the plurality of forming tool stylus parameters 216 (see FIG. 6). The plurality of forming tool stylus parameters 216 (see FIG. 6) define the forming tool stylus 214 (see FIGS. 6, 15) contact position between the intersecting curve 200 (see FIG. 14) and the part geometry model surface 206 (see FIG. 14).

As shown in FIG. 15, the exemplary forming tool stylus 214 has a first end 218a and a second end 218b, a stylus portion 220 extending from the first end 218a, and a body portion 222 coupled to or integral with the stylus portion 220 and extending between the stylus portion 220 and the second end 218b. The plurality of forming tool stylus parameters 216 (see FIG. 6) comprise one or more of, the nominal diameter 224 (see FIGS. 6, 15) of the forming tool stylus 214 (see FIGS. 6, 15), the corner radius 226 (see FIGS. 6, 15) of the forming tool stylus 214 (see FIGS. 6, 15), the overall length 228 (see FIGS. 6, 15) of the forming tool stylus 214 (see FIGS. 6, 15), the forming length 230 (see FIGS. 6, 15) of the forming tool stylus 214 (see FIGS. 6, 15), the length 232 (see FIGS. 6, 15) of the forming tool stylus 214 (see FIGS. 6, 15), the body diameter 234 (see FIG. 6) of the forming tool stylus 214 (see FIG. 6), and the non-forming diameter 236 (see FIG. 6) of the forming tool stylus 214 (see FIG. 6).

In an exemplary forming tool stylus 214 (see FIGS. 6, 15) that was defined, the plurality of forming tool stylus parameters 216 (see FIG. 6) were determined or measured and included the following: the nominal diameter 224 (see FIGS. 6, 15) of the forming tool stylus 214 (see FIGS. 6, 15) was 0.1575 inch; the corner radius 226 (see FIGS. 6, 15) of the forming tool stylus 214 (see FIGS. 6, 15) was 0.0787 inch; the overall length 228 (see FIGS. 6, 15) of the forming tool stylus 214 (see FIGS. 6, 15) was 3.3937 inch; the forming length 230 (see FIGS. 6, 15) of the forming tool stylus 214 (see FIGS. 6, 15) was 1.9685 inch; the length 232 (see FIGS. 6, 15) of the forming tool stylus 214 (see FIGS. 6, 15) was 2.3622 inch; the body diameter 234 (see FIG. 6) of the forming tool stylus 214 (see FIG. 6) was 0.5906 inch; and the non-forming diameter 236 (see FIG. 6) of the forming tool stylus 214 (see FIG. 6) was 0 inch. However, other suitable measurements of the plurality of forming tool stylus parameters 216 (see FIG. 6) may be determined or used.

Figure 16:
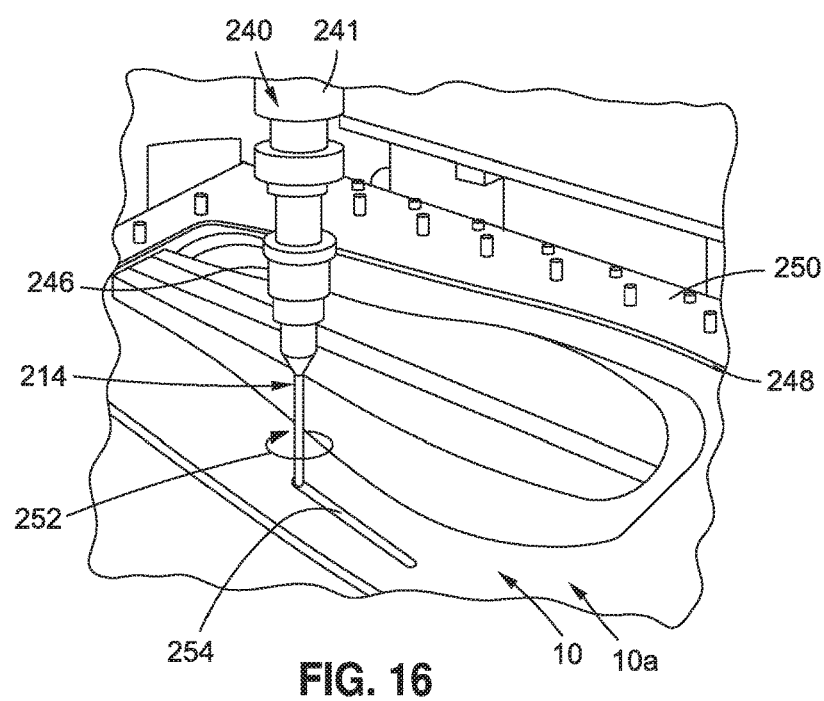
FIG. 16 is an illustration of a partial perspective view of an exemplary numerical control forming machine with a forming tool stylus forming a part formed using one or more embodiments of the methods and systems of the disclosure.

Now referring to FIG. 16, FIG. 16 is an illustration of a partial perspective view of an exemplary numerical control forming machine 240 with a forming tool stylus 214 forming a part 10, such as a sheet metal part 10*a*, formed using one or more embodiments of the computer-implemented method 70 (see FIG. 4A), the computer-implemented method 90 (see FIG. 5A), and the system 120 (see FIG. 6) of the disclosure.

As shown in FIG. 16, the forming tool stylus 214 is used with the numerical control forming machine 240, such as in the form of the numerical control incremental sheet forming (ISF) machine 241. The numerical control forming machine 240 (see FIGS. 6, 16) preferably uses a numerical control forming process 242 (see FIG. 6). The numerical control forming process 242 (see FIG. 6) preferably comprises an incremental sheet forming (ISF) process 243 (see FIG. 6), and uses the forming tool stylus 214 (see FIGS. 6, 16) to form the part 10 (see FIGS. 6, 7, 16), such as the sheet metal part 10*a* (see FIGS. 6, 16), having the plurality of central axes 122 (see FIG. 7) or multiple central (neutral) axes.

As shown in FIG. 16, the forming tool stylus 214 is coupled or connected to a spindle portion 246 of the numerical control forming machine 240, such as in the form of the numerical control incremental sheet forming (ISF) machine 241. The numerical control forming machine 240 (see FIGS. 6, 16), such as in the form of the numerical control incremental sheet forming (ISF) machine 241 (see FIGS. 6, 16), may comprise a die 248 (see FIG. 16) attached to a fixture 250 (see FIG. 16). Alternatively, the numerical control forming machine 240 (see FIGS. 6, 16), such as in the form of the numerical control incremental sheet forming (ISF) machine 241 (see FIG. 6), may have no die. As shown in FIG. 16, the forming tool stylus 214 rotates in a rotational direction 252, as it creates a tool path 254 to form the part 10, such as the sheet metal part 10*a*.

The incremental sheet forming (ISF) process 243 (see FIG. 6) is a flexible sheet metal forming technique that uses tooling to locally deform sheet metal along a predefined tool path to impart the sheet with a desired or designated shape, such as a three-dimensional shape. Single point ISF uses a single forming tool on one side of the sheet metal to cause the deformation, double-sided ISF uses one forming tool above the sheet metal and another forming tool below the sheet metal to cause the deformation, and die-based ISF uses a die below the sheet metal.

The incremental sheet forming (ISF) process 243 (see FIG. 6) may be performed on a number of different types of sheet metal materials. For example, without limitation, the ISF process 243 (see FIG. 6) may be performed using aluminum, steel, titanium, and/or other suitable metals. The sheet metal may be formed using the forming tool stylus 214 (see FIGS. 6, 16), a round-tipped tool, or another suitable type of tool. The forming tool stylus 214 (see FIGS. 6, 16), or other suitable tool, may be attached to the numerical control forming machine 240 (see FIGS. 6, 16), such as in the form of the numerical control incremental sheet forming (ISF) machine 241 (see FIGS. 6, 16), or to a robot arm, or to another suitable machine or system to shape the sheet metal into the desired shape for the part 10 (see FIGS. 6, 16), such as the sheet metal part 10*a* (see FIGS. 6, 16). The forming tool stylus 214 (see FIGS. 6, 16), or other suitable tool, make indentations, creases, or other physical changes or deformations into the sheet metal that may follow a tool path, contour, or mold line for the desired part. This tool path, contour, or mold line may be defined using the tool on which the forming tool stylus 214 (see FIGS. 6, 16) presses or deforms the sheet metal material.

Now referring to FIG. 17, FIG. 17 is an illustration of a top view of an exemplary computer-generated three-dimensional part geometry model 11 showing the intersection curve 200 as the guiding element 172*a* of the trajectory 174 (see FIG. 6) for the forming tool stylus 214 (see FIGS. 6, 15, 16) to follow, so that the forming tool stylus 214 (see FIG. 15) may be used to form the part 10 (see FIG. 7), such as the sheet metal part 10*a* (see FIG. 7), having the plurality of central axes 122 (see FIG. 7) or multiple central axes. As shown in FIG. 17, the continuous helical tool path 170 has a starting point 170*a* and an ending point 170*b*. As discussed above, performing the tool path algorithm execution 210 (see FIG. 6) further comprises generating the continuous helical tool path 170 (see FIG. 17) for the forming tool stylus 214 (see FIGS. 6, 15, 16) to use to form the part 10 (see FIG. 7), such as the sheet metal part 10*a* (see FIG. 7), having the plurality of central axes 122 (see FIG. 7). The continuous helical tool path 170 (see FIGS. 6, 17) is preferably used to generate the numerical control forming machine program 244 (see FIG. 6), such as in the form of the incremental sheet forming (ISF) machine program 245 (see FIG. 6), for execution on the numerical control forming machine 240 (see FIGS. 6, 16), such as in the form of the numerical control incremental sheet forming (ISF) machine 241 (see FIGS. 6, 16).

Figure 18:
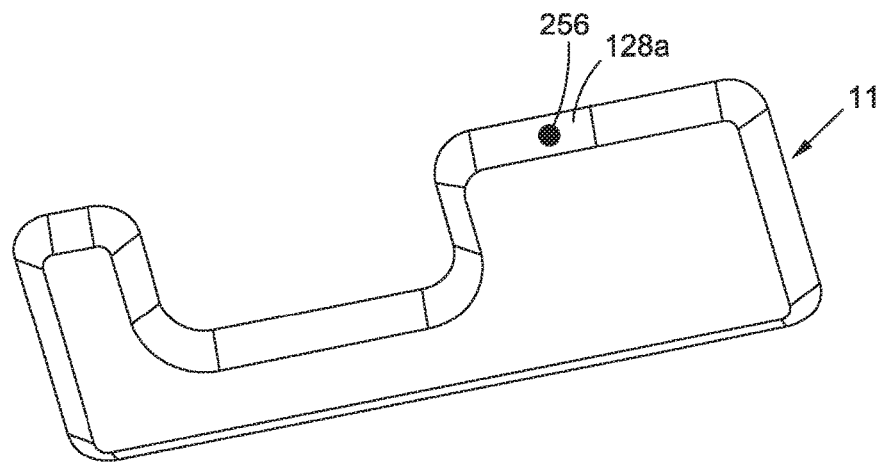
FIG. 18 is an illustration of a top perspective view of an exemplary computer-generated three-dimensional part geometry model showing a contact surface of the computer-generated three-dimensional part geometry model for a forming tool stylus to contact.

Now referring to FIG. 18, FIG. 18 is an illustration of a top perspective view of an exemplary computer-generated three-dimensional part geometry model 11 showing the contact surface 256 on a curvature surface 128*a* of the computer-generated three-dimensional part geometry model 11 for the forming tool stylus 214 (see FIGS. 15, 16) to contact. As discussed above, defining data 212 (see FIG. 6) for the forming tool stylus 214 (see FIGS. 6, 15, 16) comprises selecting the contact surface 256 (see FIG. 18), such as on the curvature surface 128*a* (see FIG. 18), of the computer-generated three-dimensional part geometry model 11 (see FIG. 18), for the forming tool stylus 214 (see FIGS. 15, 16) to contact. Once the forming tool stylus 214 (see FIGS. 15, 16) contacts the contact surface 256 (see FIG. 18), the forming tool stylus 214 (see FIGS. 15, 16) will follow the continuous helical tool path 170 (see FIG. 17) based on the intersection curve 200 (see FIG. 17) as the guiding element 172*a* (see FIG. 17).

Now referring to FIG. 19A, FIG. 19A is a schematic diagram of a 3-axis machine tool 260 that may be used with one or more embodiments of the computer-implemented method 70 (see FIG. 4A), the computer-implemented method 90 (see FIG. 5A), and the system 120 (see FIG. 6) of the disclosure. The 3-axis machine tool 260 (see FIG. 19A) preferably has a fixed tool axis 258*a* (see FIG. 6) for the forming tool stylus 214 (see FIGS. 6, 19A). As shown in FIG. 19A, the 3-axis machine tool 260 has a −x/+x axis 264, a −y/+y axis 266, and a −z/+z axis 268.

Now referring to FIG. 19B, FIG. 19B is a schematic diagram of a 5-axis machine tool 262 that may be used with one or more embodiments of the computer-implemented method 70 (see FIG. 4A), the computer-implemented method 90 (see FIG. 5A), and the system 120 (see FIG. 6) of the disclosure. The 5-axis machine tool 262 (see FIG. 19B) preferably has a fanning capable tool axis 258*b* (see FIG. 6) for the forming tool stylus 214 (see FIGS. 6, 19B). As shown in FIG. 19B, the 5-axis machine tool 262 has a −x/+x axis 264, a −y/+y axis 266, and a −z/+z axis 268, and also has a +A rotation 270 on the −x/+x axis 264, a +B rotation 272 on the −y/+y axis 266, and a +C rotation 274 on the −z/+z axis 268.

As discussed above, defining data 212 (see FIG. 6) for the forming tool stylus 214 (see FIGS. 6, 15, 16, 19A-19B) further comprises defining the tool axis 258 (see FIG. 6) for the forming tool stylus 214 (see FIGS. 6, 15, 16, 19A-19B).

The tool axis 258 (see FIG. 6) preferably comprises one of, the fixed tool axis 258a (see FIG. 6) in the 3-axis machine tool 260 (see FIG. 19A), the fanning capable tool axis 258b (see FIG. 6) in the 5-axis machine tool 262 (see FIG. 19B), or another suitable tool axis and multiple-axis machine tool. The tool axis 258 (see FIG. 6) of the forming tool stylus (see FIGS. 6, 15, 16, 19A-19B) is defined for an optimal solution based upon the kinematics of the multiple-axis machine tool used.

Now referring to FIG. 20, FIG. 20 is an illustration of a top perspective view of an exemplary computer-generated three-dimensional part geometry model 11 showing a forming feed rate (F) 276 for the forming tool stylus 214. As discussed above, defining data 212 (see FIG. 6) for the forming tool stylus 214 (see FIGS. 6, 20) further comprises defining the forming feed rate (F) 276 (see FIGS. 6, 20) for the forming tool stylus 214 (see FIGS. 6, 20). The forming feed rate (F) 276 parameters and units are defined to control the velocity at which the forming tool stylus 214 (see FIGS. 6, 20) is fed against the computer-generated three-dimensional part geometry model 11 (see FIG. 20), and in actual use, is fed against the part 10 (see FIG. 7). An exemplary forming feed rate (F) 276 (see FIG. 20) used was 39.37 inches per minute.

Figure 21:
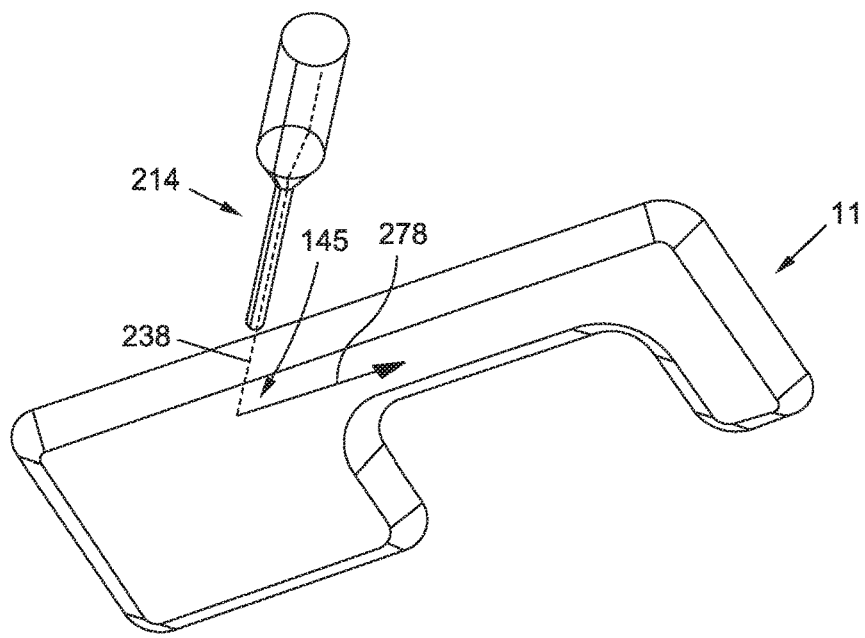
FIG. 21 is an illustration of a top perspective view of an exemplary computer-generated three-dimensional part geometry model showing a forming tool stylus centerline path in graphical space.

Now referring to FIG. 21, FIG. 21 is an illustration of a top perspective view of an exemplary computer-generated three-dimensional part geometry model 11 showing motion of a forming tool stylus centerline path 278 in graphical space 145, of a forming tool stylus centerline 238 of the forming tool stylus 214. The part 10 (see FIG. 7), such as the sheet metal part 10a (see FIG. 7), is based on the computer-generated three-dimensional part geometry model 11 (see FIGS. 8, 21), and the continuous helical tool path 170 (see FIG. 17) includes the forming tool stylus centerline path 278 (see FIG. 21) in graphical space 145 (see FIG. 21). The continuous helical tool path 170 (see FIGS. 6, 17) function may be executed to generate the motion of the forming tool stylus centerline path 278 (see FIG. 21) in graphical space 145 (see FIG. 21). This information may be used to generate data for the numerical control forming machine program 244 (see FIG. 6), such as in the form of the incremental sheet forming (ISF) machine program 245 (see FIG. 6), for execution on the numerical control forming machine 240 (see FIGS. 6, 16), such as in the form of the numerical control incremental sheet forming (ISF) machine 241 (see FIGS. 6, 16).

Now referring to FIG. 22, FIG. 22 is an illustration of a functional block diagram showing an exemplary embodiment of the computer system 300 (see FIG. 22) used with embodiments of the computer-implemented method 70 (see FIG. 4A), the computer-implemented method 90 (see FIG. 5A), and the system 120 (see FIG. 6) of the disclosure. As shown in FIG. 22, the computer system 300 comprises one or more computers 302, which may include one or more processor devices 304, and an operating system 306. The computer system 300 (see FIG. 22) may be used to implement the one or more computers 302 (see FIG. 22).

The computer system 300 (see FIG. 22) comprises at least the computer 302 (see FIG. 22), the processor device 304 for executing one or more functions of the computer 302 (see FIG. 22), a computer memory 310 (see FIG. 22), and a computer readable software program implemented tool path algorithm 334 (see FIG. 22) configured for use with the computer 302 and the processor device 304.

The one or more computer(s) 302 (see FIG. 22) may be configured to control one or more functions of one or more elements of the system 120 (see FIG. 6) through computer program instructions, such as a computer software program 332 (see FIG. 22) stored on the computer memory 310 (see FIG. 22), accessible to the one or more computer(s) 302 (see FIG. 22), or the one or more processor device(s) 304 (see FIG. 22).

As shown in FIG. 22, the computer system 300 comprises storage devices 308, such as the computer memory 310 and persistent storage 312. The computer memory 310 (see FIG. 22) may comprise one or more of a random access memory (RAM), including dynamic and/or static RAM, on-chip or off-chip cache memory, or other suitable computer memory 310 (see FIG. 22). The persistent storage 312 (see FIG. 22) may comprise one or more of a flash memory, a hard drive, Read-Only Memory (ROM), magnetic storage devices such as hard disks, floppy disk drives, and rewritable magnetic tape, rewritable optical disk drives and/or media, non-volatile random access memory (NVRAM), or other suitable persistent storage 312 (see FIG. 22).

As shown in FIG. 22, the computer system 300 may further comprise one or more computer communications device(s) 314, such as one or more network communications device(s) 316, for linking the computer-implemented system 120 (see FIG. 6), for example, to one or more separate systems. The one or more network communications device(s) 316 (see FIG. 22) may comprise network links between various computers and devices connected together within a network data processing system via wire connections, wireless communication links, fiber optic cables, or other suitable network connections, and that may connect to a network, a server, the Internet, or another system or device.

The one or more computer communications device(s) 314 (see FIG. 22) may be configured to provide for communications in accordance with any of a number of wired or wireless communication standards. The one or more computer(s) 302 (see FIG. 22) or one or more processor device(s) 304 (see FIG. 22) may also be configured to facilitate communications via the one or more computer communications device(s) 314 (see FIG. 22) by, for example, controlling hardware included within the one or more computer communications device(s) 314 (see FIG. 22). The one or more computer communications device(s) 314 (see FIG. 22) may include, for example, one or more antennas, a transmitter, a receiver, a transceiver and/or supporting hardware, including, for example, a processor for enabling communications.

As shown in FIG. 22, the computer system 300 further comprises one or more input/output unit(s) 318, a display 320, and a power supply 324. The one or more input/output unit(s) 318 (see FIG. 22) provide for the input and output of data with other devices connected to the computer system 300 (see FIG. 22), such as computer interfaces. The one or more input/output unit(s) 318 (see FIG. 22) may comprise such devices as a keyboard, a mouse, a joystick, or other input/output devices. For example, the one or more input/output unit(s) 318 (see FIG. 22) may provide a connection for user input though a keyboard and mouse, or may send output to a printer or other device. The display 320 (see FIG. 22) provides the means to display data or information to a user such as a pilot, one or more separate automated systems, automated computer programs, automated apparatuses, or automated devices, or another suitable separate system, program, or device. The power supply 324 (see FIG. 22) of the computer system 300 (see FIG. 22) may comprise batteries, electricity, or other power supply elements.

As shown in FIG. 22, the computer system 300 further comprises a data bus 322 that transfers data between the one or more computers 302, the storage devices 308, the one or more computer communications devices 314, the one or more input/output units 318, and the display 320. The data bus 322 (see FIG. 22) may include hardware components such as wires, optical fibers, and other hardware devices, and may include software components such as communications protocols or other software devices.

As shown in FIG. 22, a computer program product 328 may be used in the computer system 300 by loading the computer program product 328 into the computer system 300 via a loading mechanism 326 or other suitable mechanism. The computer program product 328 (see FIG. 22) may comprise a system logic 330 (see FIG. 22). As shown in FIG. 22, the system logic 330 may comprise a computer software program 332, the computer readable software program implemented tool path algorithm 334, program code, computer software, computer firmware, or another suitable system logic 330. As shown in FIG. 22, the computer program product 328 further comprises a computer readable medium 336. The computer readable medium 336 (see FIG. 22) may comprise a computer readable storage media 338 (see FIG. 22), a computer readable signal media 340 (see FIG. 22), or another suitable computer readable medium 336 (see FIG. 22).

The system logic 330 (see FIG. 22), such as the computer software program 332 (see FIG. 22), the computer readable software program implemented tool path algorithm 334 (see FIG. 22), program code, computer software, a computer firmware, or other suitable system logic 330, may be stored in and retrieved from the computer readable storage media 338 (see FIG. 22) and loaded into the one or more computer(s) 302 (see FIG. 22), the one or more processor device(s) 304, or other programmable device, to configure and direct the one or more computer(s) 302, the one or more processor device(s) 304, or other programmable device to execute operations to be performed on or by the one or more computer(s) 302, the one or more processor device(s) 304, or other programmable device, and to function in a particular way. Execution of the system logic 330 (see FIG. 22), such as the computer software program 332 (see FIG. 22), the computer readable software program implemented tool path algorithm 334 (see FIG. 22), the program code, computer software, computer firmware, or other suitable system logic 330, may produce a computer-implemented system, process or method, such that the system logic 330 (see FIG. 22), such as the computer software program 332 (see FIG. 22), the computer readable software program implemented tool path algorithm 334 (see FIG. 22), the program code, computer software, computer firmware, or other suitable system logic 330, executed by the one or more computer(s) 302 (see FIG. 22), one or more processor device(s) 304 (see FIG. 22), or other programmable device, provide operations for implementing the functions disclosed herein Disclosed embodiments of the method 70 (see FIG. 4A), the method 90 (see FIG. 5A), and the system 120 (see FIG. 6) provide computer-implemented methods 70, 90 (see FIGS. 4A, 5A) and a computer-implemented system 120 (see FIG. 6) for generating the continuous helical tool path 170 (see FIGS. 6, 17) for forming parts 10 (see FIG. 7), such as sheet metal parts 10a (see FIG. 7) having a plurality of central axes 122 (see FIG. 7) or multiple central (neutral) axes, and are particularly useful for, although not restricted to, incremental sheet forming (ISF) manufacturing. The computer-implemented methods 70, 90 (see FIGS. 4A, 5A) and computer-implemented system 120 (see FIG. 6) provide an optimal solution for producing continuous helical tool path motion and a continuous helix sweeping intersection tool path for parts 10 having complex geometries and presenting more than one central or neutral axis within the same surface, with ISF manufacturing operations, and provide a universal tool path algorithm designed for ISF manufacturing operations and a universal solution to computer software utility programs 280 (see FIG. 6) that include tool path manufacturing workbench programs 282 (see FIG. 6), and more specifically include programs such as, computer aided design (CAD) programs 284 (see FIG. 6), computer aided manufacturing (CAM) programs 286 (see FIG. 6), and computer aided engineering (CAE) programs 288 (see FIG. 6). Based on a plurality of forming tool stylus parameters 216 (see FIG. 6) for the forming tool stylus 214 (see FIG. 6) and based on a plurality of predetermined helix variables 152 (see FIG. 6) for the helix 150 (see FIG. 6), a revolving tool path or continuous helical tool path 170 (see FIG. 6) is defined with a helical-shaped intersecting curve as a trajectory.

In addition, disclosed embodiments of the computer-implemented methods 70, 90 (see FIGS. 4A, 5A) and computer-implemented system 120 (see FIG. 6) advance ISF manufacturing capability; reduce or eliminate accelerations and decelerations of the forming tool stylus 214 (see FIGS. 15, 16), or machine tool, of, for example, a numerical control ISF machine 241 (see FIGS. 6, 16), caused by short transitions of directional change between the levels or passes of the computer-generated three-dimensional part geometry model 11 (see FIG. 8); reduce or eliminate multiple engagements and retractions, and multiple stops and changes of direction, of the forming tool stylus 214 (see FIGS. 15, 16), or machine tool, on the surface of the part 10, such as the sheet metal part 10a (see FIG. 7), during formation of the part 10 (see FIG. 7), thus reducing or eliminating surface imperfections, which in turn, may result in reducing or eliminating surface treatment processes to remove the surface imperfections, and may result in decreased time and expense of manufacturing; provide a smooth continuous contacted tool path motion that follows the curvature or mold line like features of the part geometry or part design, and generate a solution for a continuously advancing forward type tool path motion, for example, during ISF manufacturing operations; and generate a high quality surface of the part 10 (see FIG. 7), such as the sheet metal part 10a (see FIG. 7), during ISF manufacturing operations, thus improving surface finish quality of the part 10 (see FIG. 7).

Moreover, disclosed embodiments of the computer-implemented methods 70, 90 (see FIGS. 4A, 5A) and computer-implemented system 120 (see FIG. 6) are capable of being automated and may easily be automated with programming software by simply interfacing the defined instructions or steps of the methods 70, 90 (see FIGS. 4A, 5A) with variable user inputs. Further, disclosed embodiments of the computer-implemented methods 70, 90 (see FIGS. 4A, 5A) and computer-implemented system 120 (see FIG. 6) reduce lead time (i.e., 2 or more years) of software production implementation and reduce lead time to fix a complex problem; decrease expensive software development enhancement fees to fix a complex problem, and increase cost savings with reduced software development, to provide quick and easy implementation with no additional software development required; and provide improved implementation for efficient research and development work, thus reducing or avoiding costs of research and development efforts.

In addition, disclosed embodiments of the computer-implemented methods 70, 90 (see FIGS. 4A, 5A) and computer-implemented system 120 (see FIG. 6) provide faster lead time to fabricate new tooling and produce replacement parts or spare parts, such as replacement parts or spare parts for aircraft and rotorcraft brought back into service. For example, the lead time to fabricate new tooling and manufacture the part, from design to manufacture, may be reduced from over 200 days (two hundred days) down to 5-7 days (five to seven days), and may result in overall decreased time and costs of manufacturing. Moreover, disclosed embodiments of the computer-implemented methods 70, 90 (see FIGS. 4A, 5A) and computer-implemented system 120 (see FIG. 6) are adaptable to complex part design geometries and production of parts in limited numbers and for prototype testing; generate and output a numerical control forming machine program 244 (see FIG. 6), such as an ISF machine program 245 (see FIG. 6), for a numerical control forming machine 240 (see FIGS. 6, 16), such as a numerical control ISF machine 241 (see FIGS. 6, 16), to form a part 10 (see FIGS. 7, 16), such as a sheet metal part 10a (see FIGS. 7, 16); and provide benefit to air vehicles such as commercial aircraft and rotorcraft, general aviation, automotive, consumer goods, and industrial equipment for prototyping or mass customization with the use of computer software utility programs 280 (see FIG. 6), such as CAD programs 284 (see FIG. 6), CAM programs 286 (see FIG. 6), and CAE programs 288 (see FIG. 6) software.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation. Any claimed embodiment of the disclosure does not necessarily include all of the embodiments of the disclosure.

What is claimed is:

1. A computer-implemented method for generating a continuous helical tool path for forming a part having a plurality of axes, the method comprising:
    performing a tool path algorithm modeling using a computer system, the tool path algorithm modeling comprising:
        defining a starting point location within a computer-generated three-dimensional part geometry model comprising a contoured recess having a periphery that includes a plurality of curvature surfaces respectively associated with a plurality of part geometry model central axes;
        defining a vector starting from the starting point location;
        defining a helix using a plurality of predetermined helix variables, the helix defined within the contoured recess and revolved around the vector;
        defining a sweeping surface three-dimensional geometry element representing a radial projection of the helix, the sweeping surface three-dimensional geometry element extending radially outwardly from a helix axial centerline, through a plurality of predetermined helix revolutions, to an exterior area that is exterior to the periphery of the computer-generated three-dimensional part geometry model; and
        generating an intersection curve, resulting from tracing a continuous curved line of an intersection between the sweeping surface three-dimensional geometry element and a part geometry model surface of the computer-generated three-dimensional part geometry model, wherein generating the intersection curve further comprises:
            defining the part geometry model surface of the computer-generated three-dimensional part geometry model to be intersected;
            intersecting between the sweeping surface three-dimensional geometry element and the part geometry model surface of the computer-generated three-dimensional part geometry model;
            tracing the intersection between the sweeping surface three-dimensional geometry element and the part geometry model surface of the computer-generated three-dimensional part geometry model as the continuous curved line, by tracing the continuous curved line from an intersection starting point, where the intersection starts and revolves around, to an intersection ending point where the intersection ends; and
            resulting in the continuous curved line to generate the intersection curve; and
    performing a tool path algorithm execution using the computer system, the tool path algorithm execution comprising:
        defining data for a forming tool stylus used to form the part having the plurality of central axes;
        selecting the intersection curve as a guiding element for the forming tool stylus to follow; and
        generating the continuous helical tool path for the forming tool stylus to use to form the part having the plurality of central axes, the part based on the computer-generated three-dimensional part geometry model, and the continuous helical tool path including a forming tool stylus centerline path in graphical space.

2. The method of claim 1, further comprising using the continuous helical tool path to generate a numerical control forming machine program, for execution on a numerical control forming machine, that uses a numerical control forming process and the forming tool stylus, to form the part having the plurality of central axes.

3. The method of claim 2, further comprising using the continuous helical tool path to generate the numerical control forming machine program comprising an incremental sheet forming (ISF) machine program, for execution on the numerical control forming machine comprising a numerical control incremental sheet forming (ISF) machine, that uses the numerical control forming process comprising an incremental sheet forming (ISF) process and the forming tool stylus, to form the part having the plurality of central axes.

4. The method of claim 1, further comprising using the continuous helical tool path with a computer software utility program comprising one of, a tool path manufacturing workbench program, a computer aided design (CAD) program, a computer aided manufacturing (CAM) program, and a computer aided engineering (CAE) program.

5. The method of claim 1, wherein defining the helix comprises using the plurality of predetermined helix variables comprising a predetermined helix diameter, a predetermined helix constant pitch, a predetermined helix height between a helix starting point and a helix ending point, a predetermined helix taper angle or a predetermined part geometry model forming angle, and the plurality of predetermined helix revolutions.

6. The method of claim 1, wherein defining data for the forming tool stylus comprises:

defining the forming tool stylus using a plurality of forming tool stylus parameters;

selecting a contact surface of the computer-generated three-dimensional part geometry model for the forming tool stylus to contact;

defining a tool axis for the forming tool stylus; and defining a forming feed rate for the forming tool stylus.

7. The method of claim 6, wherein defining the forming tool stylus comprises using the plurality of forming tool stylus parameters comprising one or more of, a nominal diameter of the forming tool stylus, a corner radius of the forming tool stylus, an overall length of the forming tool stylus, a forming length of the forming tool stylus, a length of the forming tool stylus, a body diameter of the forming tool stylus, and a non-forming diameter of the forming tool stylus.

8. The method of claim 6, wherein defining the tool axis of the forming tool stylus comprises using one of, a 3-axis machine tool with a fixed tool axis, and a 5-axis machine tool with a fanning tool axis capability.

9. The method of claim 1, wherein performing the tool path algorithm modeling and performing the tool path algorithm execution, using the computer system, further comprises using the computer system comprising at least a computer, a processor device for executing one or more functions of the computer, a computer memory, and a computer readable software program implemented tool path algorithm configured for use with the computer and the processor device.

10. A computer-implemented method for generating a continuous helical tool path for forming a sheet metal part having a plurality of central axes, the method comprising:

generating a computer-generated three-dimensional part geometry model comprising a contoured recess having a periphery that includes a plurality of curvature surfaces respectively associated with a plurality of part geometry model central axes;

performing a tool path algorithm modeling using a computer system comprising at least a computer, a processor device for executing one or more functions of the computer, and a computer readable software program implemented tool path algorithm configured for use with the computer and the processor device, the tool path algorithm modeling comprising:

defining a starting point location within the computer-generated three-dimensional part geometry model;

defining a vector starting from the starting point location;

defining a helix using a plurality of predetermined helix variables, the helix defined within the contoured recess and revolved around the vector;

defining a sweeping surface three-dimensional geometry element representing a radial projection of the helix, the sweeping surface three-dimensional geometry element extending radially outwardly from a helix axial centerline, through a plurality of predetermined helix revolutions, to an exterior area that is exterior to the periphery of the computer-generated three-dimensional part geometry model; and generating an intersection curve resulting from tracing a continuous curved line of an intersection between the sweeping surface three-dimensional geometry element and a part geometry model surface of the computer-generated three-dimensional part geometry model, wherein generating the intersection curve further comprises:

defining the part geometry model surface of the computer-generated three-dimensional part geometry model to be intersected;

intersecting between the sweeping surface three-dimensional geometry element and the part geometry model surface of the computer-generated three-dimensional part geometry model;

tracing the intersection between the sweeping surface three-dimensional geometry element and the part geometry model surface of the computer-generated three-dimensional part geometry model as the continuous curved line, by tracing the continuous curved line from an intersection starting point, where the intersection starts and revolves around, to an intersection ending point where the intersection ends; and resulting in the continuous curved line to generate the intersection curve;

performing a tool path algorithm execution using the computer system comprising at least the computer, the processor device, and the computer readable software program implemented tool path algorithm, the tool path algorithm execution comprising:

defining a forming tool stylus using a plurality of forming tool stylus parameters;

selecting the intersection curve as a guiding element for the forming tool stylus to follow;

selecting a contact surface of the computer-generated three-dimensional part geometry model for the forming tool stylus to contact;

defining a tool axis for the forming tool stylus;

defining a forming feed rate for the forming tool stylus; and generating the continuous helical tool path for the forming tool stylus to use to form the sheet metal part having the plurality of central axes, the sheet metal part based on the computer-generated three-dimensional part geometry model, and the continuous helical tool path including a forming tool stylus centerline path in graphical space; and using the continuous helical tool path to generate an incremental sheet forming (ISF) machine program for execution on a numerical control incremental sheet forming (ISF) machine that uses an incremental sheet forming (ISF) process and the forming tool stylus to form the sheet metal part having the plurality of central axes.

11. The method of claim 10, further comprising using the continuous helical tool path with a computer software utility program comprising one of, a tool path manufacturing workbench program, a computer aided design (CAD) program, a computer aided manufacturing (CAM) program, and a computer aided engineering (CAE) program.

12. The method of claim 10, wherein defining the helix comprises using the plurality of predetermined helix variables comprising a predetermined helix diameter, a predetermined helix constant pitch, a predetermined helix height between a helix starting point and a helix ending point, a predetermined helix taper angle or a predetermined part geometry model forming angle, and the plurality of predetermined helix revolutions.

13. The method of claim 10, wherein defining the tool axis of the forming tool stylus comprises using one of, a 3-axis machine tool with a fixed tool axis, and a 5-axis machine tool with a fanning tool axis capability.

14. The method of claim 10, wherein defining the forming tool stylus comprises using the plurality of forming tool stylus parameters comprising one or more of, a nominal diameter of the forming tool stylus, a corner radius of the forming tool stylus, an overall length of the forming tool stylus, a forming length of the forming tool stylus, a length of the forming tool stylus, a body diameter of the forming tool stylus, and a non-forming diameter of the forming tool stylus.

15. A system for generating a continuous helical tool path for forming a part having a plurality of central axes, the system comprising:
   a computer-generated three-dimensional part geometry model comprising a contoured recess having a periphery that includes a plurality of curvature surfaces respectively associated with a plurality of part geometry model central axes; and
   a computer system comprising at least a computer, a processor device for executing one or more functions of the computer, and a computer readable software program implemented tool path algorithm configured to perform via the computer and the processor device, a tool path algorithm modeling and a tool path algorithm execution, wherein the tool path algorithm modeling comprises:
      defining a starting point location within the computer-generated three-dimensional part geometry model;
      defining a vector starting from the starting point location;
      defining a helix using a plurality of predetermined helix variables, the helix defined within the contoured recess and revolved around the vector;
      defining a sweeping surface three-dimensional geometry element representing a radial projection of the helix, the sweeping surface three-dimensional geometry element extending radially outwardly from a helix axial centerline, through a plurality of predetermined helix revolutions, to an exterior area that is exterior to the periphery of the computer-generated three-dimensional part geometry model; and
      generating an intersection curve resulting from tracing a continuous curved line of an intersection between the sweeping surface three-dimensional geometry element and a part geometry model surface of the computer-generated three-dimensional part geometry model, wherein generating the intersection curve further comprises:
         defining the part geometry model surface of the computer-generated three-dimensional part geometry model to be intersected;
         intersecting between the sweeping surface three-dimensional geometry element and the part geometry model surface of the computer-generated three-dimensional part geometry model;
         tracing the intersection between the sweeping surface three-dimensional geometry element and the part geometry model surface of the computer-generated three-dimensional part geometry model as the continuous curved line, by tracing the continuous curved line from an intersection starting point, where the intersection starts and revolves around, to an intersection ending point where the intersection ends; and
         resulting in the continuous curved line to generate the intersection curve;

and wherein the tool path algorithm execution comprises:
   defining data for a forming tool stylus used to form the part having the plurality of central axes;
   selecting the intersection curve as a guiding element for the forming tool stylus to follow;
   generating the continuous helical tool path for the forming tool stylus to use to form the part having the plurality of central axes, the part based on the computer-generated three-dimensional part geometry model, and the continuous helical tool path including a forming tool stylus centerline path in graphical space; and
   generating a numerical control forming machine program from the continuous helical tool path, for execution on a numerical control forming machine, that uses a numerical control forming process and the forming tool stylus, to form the part having the plurality of central axes.

16. The system of claim 15, wherein the numerical control forming machine program comprises an incremental sheet forming (ISF) machine program, the numerical control forming machine comprises a numerical control incremental sheet forming (ISF) machine, and the numerical control forming process comprises an incremental sheet forming (ISF) process.

17. The system of claim 15, wherein the system further comprises a computer software utility program used with the continuous helical tool path, the computer software utility program comprising one of, a tool path manufacturing workbench program, a computer aided design (CAD) program, a computer aided manufacturing (CAM) program, and a computer aided engineering (CAE) program.

18. The system of claim 15 wherein the plurality of predetermined helix variables comprise a predetermined helix diameter, a predetermined helix constant pitch, a predetermined helix height between a helix starting point and a helix ending point, a predetermined helix taper angle or a predetermined part geometry model forming angle, and the plurality of predetermined helix revolutions.

19. The system of claim 15, wherein the part having the plurality of central axes comprises a sheet metal part having the plurality of central axes, wherein the sheet metal part is made of a sheet metal material comprising one of, aluminum, steel, and titanium.

20. The system of claim 15, wherein defining data for the forming tool stylus comprises:
   defining the forming tool stylus using a plurality of forming tool stylus parameters comprising one or more of, a nominal diameter of the forming tool stylus, a corner radius of the forming tool stylus, an overall length of the forming tool stylus, a forming length of the forming tool stylus, a length of the forming tool stylus, a body diameter of the forming tool stylus, and a non-forming diameter of the forming tool stylus;
   selecting a contact surface of the computer-generated three-dimensional part geometry model for the forming tool stylus to contact;
   defining a tool axis for the forming tool stylus, the tool axis comprising one of, a fixed tool axis in a 3-axis machine tool, and a fanning capable tool axis in a 5-axis machine tool; and
   defining a forming feed rate for the forming tool stylus.

* * * * *